US012545585B2

United States Patent
Alzahrani et al.

(10) Patent No.: US 12,545,585 B2
(45) Date of Patent: Feb. 10, 2026

(54) METHOD OF MAKING CARBON NANOTUBE BUNDLES

(71) Applicant: King Abdulaziz University, Jeddah (SA)

(72) Inventors: Ahmed Obaid Alzahrani, Jeddah (SA); Meshari Abdullah Alayash, Jeddah (SA); Salem D. Alghamdi, Jeddah (SA); Sami Alghamdi, Jeddah (SA); Ammar Melaibari, Jeddah (SA); Saleh Ahmed Al-Ghamdi, Jeddah (SA); Thamer S. Almoneef, Jeddah (SA)

(73) Assignee: King Abdulaziz University, Jeddah (SA)

( * ) Notice: Subject to any disclaimer, the term of this patent is extended or adjusted under 35 U.S.C. 154(b) by 454 days.

(21) Appl. No.: 18/319,145

(22) Filed: May 17, 2023

(65) Prior Publication Data
US 2024/0383756 A1    Nov. 21, 2024

(51) Int. Cl.
*C01B 32/174* (2017.01)
*C01B 32/164* (2017.01)

(52) U.S. Cl.
CPC .......... *C01B 32/174* (2017.08); *C01B 32/164* (2017.08); *C01B 2202/06* (2013.01); *C01P 2004/51* (2013.01); *C01P 2004/64* (2013.01)

(58) Field of Classification Search
CPC . C01B 32/174; C01B 32/164; C01B 2202/06; C01B 32/158; C01B 32/159; C01B 32/16; C01B 32/162; C01B 32/166; C01B 32/168; C01B 32/17; C01B 32/172; C01B 32/176; C01B 32/178;
(Continued)

(56) References Cited

U.S. PATENT DOCUMENTS 6,900,580 B2    5/2005    Dai et al.
7,985,398 B2    7/2011    Brooks et al.
(Continued)

FOREIGN PATENT DOCUMENTS

IN    292853    12/2012

OTHER PUBLICATIONS

Alzahrani, et al., A simple method to form a forest of carbon nanotube bundles during growth stage, SN Applied Sciences 2022; 4: 218, pp. 1-12 (Year: 2022).*
(Continued)

*Primary Examiner* — Daniel C. McCracken
(74) *Attorney, Agent, or Firm* — Oblon, McClelland, Maier & Neustadt, L.L.P.

(57) ABSTRACT

A method of making an array of vertically-aligned CNT bundles includes dispersing iron oxide nanoparticles in a solvent to form a suspension. The method further includes dipping a TiN-coated substrate in the suspension and removing to form a suspension-coated substrate. The method also involves drying the suspension-coated substrate by evaporating the solvent from the suspension-coated substrate to form a first sample. Furthermore, the method includes treating the first sample by microwave plasma under hydrogen flow at 500 degrees centigrade (° C.) to 700° C. to form a pre-treated sample followed by treating the pre-treated sample by microwave plasma under methane flow at 500° C. to 700° C. to form the vertically-aligned carbon nanotube bundles.

20 Claims, 22 Drawing Sheets

(58) Field of Classification Search
CPC ............ C01B 2202/00; C01B 2202/02; C01B 2202/04; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; C01P 2004/51; C01P 2004/64; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

U.S. PATENT DOCUMENTS

| | | | |
|---|---|---|---|
| 2006/0252251 A1* | 11/2006 | Park | H01J 9/025 438/618 |
| 2007/0020168 A1 | 1/2007 | Asmussen et al. | |
| 2012/0313591 A1 | 12/2012 | Brambilla et al. | |

OTHER PUBLICATIONS

Song, Enhanced field emission properties of single-walled carbon nanotube from dip-coating catalyst, Physica B 2021; 603: 412766, pp. 1-6 (Year: 2021).*

Liu, et al., Advances of microwave plasma-enhanced chemical vapor deposition in fabrication of carbon nanotubes: a review, J. Mater. Sci. 2021; 56: 12559-12583 (Year: 2021).*

Alzahrani et al. ; A simple method to form a forest of carbon nanotube bundles during growth stage ; SN Applied Sciences ; Jul. 9, 2022 ; 12 Pages.

* cited by examiner

METHOD OF MAKING CARBON NANOTUBE BUNDLES

STATEMENT REGARDING PRIOR DISCLOSURE BY THE INVENTORS

Aspects of this technology are described in an article "A simple method to form a forest of carbon nanotube bundles during growth stage" published in SN Applied Sciences, Volume 4, Article number 218, July 2022, which is incorporated herein by reference in its entirety.

STATEMENT OF ACKNOWLEDGEMENT

This research was supported by the Institutional Fund Projects from the Ministry of Education and King Abdulaziz University under the grant number IFPRC-142-130-2020.

BACKGROUND

Technical Field

The present disclosure is directed to a method of making carbon nanotubes (CNTs) and particularly relates to a method of making vertically-aligned CNT bundles.

Description of Related Art

The "background" description herein generally presents the context of the disclosure. Work of the presently named inventors, to the extent it is described in this background section, as well as aspects of the description that may not otherwise qualify as prior art at the time of filing, are neither expressly nor impliedly admitted as prior art against the present invention.

Carbon nanotubes are highly attractive for research due to their superb mechanical [Salvetat, J. P. et al. Mechanical properties of carbon nanotubes. Appl. Phys. A. 69, 255-260 (1999)], optical [Schadler, L. S. & Zhao, Y. Ultrafast optical switching properties of single-wall carbon nanotube polymer composites at 1.55 µm. Appl. Phys. Lett. 81, 975 (2002)], and electrical properties [De Volder, M. F. L., Tawfick, S. H., Baughman, R. H. & Hart, A. J. Carbon nanotubes: Present and future commercial applications. Science 339, 535-539 (2013)]. CNTs have practical and commercial applications in several fields. An application in high demand is electron field emission devices requiring a high-density flow of electrons [De Heer, W. A., Chatelain, A. & Ugarte, D. A carbon nanotube field-emission electron source. Science 270, 1179-1180 (1995)].

Field emitters play a crucial role in several essential industries, such as display screens [Wang, Q. H., Yan, M. & Chang, R. P. H. Flat panel display prototype using gated carbon nanotube field emitters. Appl. Phys. Lett. 78, 1294-1296 (2001)], X-ray sources [Sugie, H. et al. Carbon nanotubes as electron source in an X-Ray tube. Appl. Phys. Lett. 78, 2578-2580 (2001)], and electron guns [Dong, L., Arai, F. & Fukuda, T. Electron-beam-induced deposition with carbon nanotube emitters. Appl. Phys. Lett. 81, 1919-1921 (2002)].

An array of vertically aligned multiwall CNTs (MW-CNTs) can function as electron field emitters. Nevertheless, when arranged in the form of a continuous uniform film, the screening effect reduces the efficiency of the device [Bocharov, G. & Eletskii, A. Theory of carbon nanotube (CNT)-based electron field emitters. Nanomaterials 3, 393-442 (2013)]. Consequently, an isolated CNT can produce a larger field emission current than one embedded in a large "forest" of CNTs [Liu, H., Kato, S. & Saito, Y. Empirical expression for the emission site density of nanotube film emitters. Nanotechnology 20, 275206 (2009)].

To overcome this drawback, lithography was used to obtain patterned CNTs by precisely controlling the catalyst spacing [Zhu, L. et al. Growth and electrical characterization of high-aspect-ratio carbon nanotube arrays. Carbon N. Y. 44, 253-258 (2006)]. However, such a process is expensive and time-consuming, especially if a large sample area ($cm^2$) is required. An alternative technique based on the post-treatment of CNT films is used to form a local assembly of the tubes using dry densification [Wang, T., Jeppson, K. & Liu, J. Dry densification of carbon nanotube bundles. Carbon N. Y. 48, 3795-3801 (2010)] or liquid [Lim, Y. D. et al. Enhanced field emission properties of carbon nanotube films using densification technique. Appl. Surf. Sci. 477, 211-219 (2017)]. During dry densification, the CNT bundles are sealed with a silicon oxide coating under low pressure, and densification occurs due to a sudden pressure change when the chamber is vented [Wang, T., Jeppson, K. & Liu, J. Dry densification of carbon nanotube bundles. Carbon N. Y. 48, 3795-3801 (2010)]. However, this requires patterned CNT bundles prepared using lithographical techniques as the first step.

Several other studies used liquid densification with ethanol [Lim, Y. D. et al. Enhanced field emission properties of carbon nanotube films using densification technique. Appl. Surf. Sci. 477, 211-219 (2017)] and acids [Correa-Duarte, M. A. et al. Fabrication and biocompatibility of carbon nanotube-based 3D networks as scaffolds for cell seeding and growth. Nano Lett. 4, 2233-2236 (2004)]. Nonetheless, such chemical processes might also etch the nanotubes and affect their electrical properties negatively.

In view of the forgoing, one objective of the present disclosure is to develop a method to densify the CNTs into bundles while overcoming the drawbacks of the art. A further objective of the present disclosure is to provide a method for making iron oxide nanoparticles.

SUMMARY

In an exemplary embodiment, a method of making an array of vertically-aligned CNT bundles is described. The method includes dispersing iron oxide nanoparticles in a solvent to form a suspension. The method further includes dipping a TiN-coated substrate in the suspension and removing to form a suspension-coated substrate. Furthermore, the method includes drying the suspension-coated substrate by evaporating the solvent from the suspension-coated substrate to form a first sample. The method further includes treating the first sample with microwave plasma under hydrogen flow at 500 degrees centigrade (° C.) to 700° C. to form a pre-treated sample. Additionally, the method involves treating the pre-treated sample by microwave plasma under methane flow at 500° C. to 700° C. to form the vertically-aligned carbon nanotube bundles.

In some embodiments, the iron oxide nanoparticles have an average particle size of 5 to 35 nanometers (nm).

In some embodiments, the iron oxide nanoparticles contain $Fe_3O_4$. In some embodiments, an average number density of the iron oxide nanoparticles on the surface of the TiN-coated substrate is in a range of 800 to 1,200 particles per square micrometer (particles/$\mu m^2$).

In some embodiments, the solvent is at least one selected from the group consisting of hexane, cyclohexane, heptane, diethyl ether, butane, iso-butylene, pentane, acetone, and dichloromethane.

In some embodiments, the TiN-coated substrate is a TiN-coated stainless steel.

In some embodiments, the hydrogen flow is introduced onto the first sample at a rate of 50 to 150 standard cubic centimeters per minute (sccm).

In some embodiments, the methane flow is introduced onto the pre-treated sample at a rate of 5 to 50 sccm.

In some embodiments, the method includes treating the first sample by microwave plasma under a pressure of 4 to 10 kilopascals (kPa) with a microwave power of 500 to 1500 Watts (W) for 5 to 30 minutes.

In some embodiments, the vertically-aligned carbon nanotube bundles have ends opposite to where the carbon nanotube bundles are attached. In some embodiments, the vertically-aligned carbon nanotube bundles are twisted into helical configurations.

In some embodiments, the vertically-aligned carbon nanotube bundles include cauliflower-shaped aggregates formed at the ends of the helical configurations of the bundles. In some embodiments, the cauliflower-shaped aggregates are formed by nanoparticles with an average particle size of 5 to 35 nm.

In some embodiments, the vertically-aligned carbon nanotube bundles include CNT bundles. In some embodiments, the average number density of the CNT bundles on the surface of the TiN-coated substrate is in a range of $3 \times 10^9$ to $5 \times 10^9$ bundles/m$^2$. In some embodiments, the average nearest distance between CNT bundles is in a range of 10 to 20 micrometers ($\mu$m).

In some embodiments, the CNT bundles contain multi-wall carbon nanotubes (MWCNT). In some embodiments, the MWCNTs have an average number of 3 to 20 walls per MWCNT. In some embodiments, the MWCNTs have an average inner diameter in a range of 7 to 13 nm. In some embodiments, the MWCNTs have an average outer diameter in a range of 10 to 16 nm. In some embodiments, the MWCNTs have an average height in a range of 14 to 23 $\mu$m.

In another exemplary embodiment, the method further includes preparing the iron oxide nanoparticles by mixing and dissolving a fatty acid in dialkyl ether to form a first mixture. The method also includes heating the first mixture at 90 to 120° C. Additionally, the method involves mixing an iron precursor with the mixture after the heating and refluxing at 250 to 350° C. for 0.5 to 2 hours to form a second mixture. Furthermore, the method involves separating the iron oxide nanoparticles from the second mixture, washing, and drying to form the iron oxide nanoparticles.

In some embodiments, the second mixture includes the iron oxide nanoparticles.

In some embodiments, the fatty acid has a carbon chain ranging from 10 to 22 carbon atoms in length.

In some embodiments, the fatty acid is oleic acid.

In some embodiments, the dialkyl ether is a di-n-alkyl ether having a total of from 12 to 36 carbon atoms. In some embodiments, the di-n-alkyl ether is at least one selected from the group consisting of di-n-octyl ether, di-n-decyl ether, di-n-nonyl ether, n-undecyl ether, di-n-dodecyl ether, n-hexyl n-octyl ether, n-octyl n-decyl ether, n-decyl n-undecyl ether, n-undecyl n-dodecyl ether, n-hexyl n-undecyl ether, di-tert-butyl ether, di-isopentyl ether, di-3-ethyl decyl ether, tert-butyl n-octyl ether, iso-pentyl n-octyl ether, 2-methylpentyl n-octyl ether.

In some embodiments, the dialkyl ether is dioctyl ether.

In some embodiments, the iron precursor is at least one selected from the group consisting of an iron complex, iron carbonyl, an iron salt, an iron salt of saturated or unsaturated fatty acid, an organic iron compound, and an iron sandwich complex.

In some embodiments, the iron precursor is iron carbonyl. In some embodiments, the iron carbonyl is at least one selected from the group consisting of iron dicarbonyl (Fe(CO)$_2$), iron tetracarbonyl (Fe(CO)$_4$), and iron pentacarbonyl (Fe(CO)$_5$).

In some embodiments, a molar ratio of iron precursor and dialkyl ether is 1:50 to 1:15. In some embodiments, a molar ratio of iron precursor and fatty acid is 1:1 to 1:10.

In some embodiments, the iron precursor is present in the dialkyl ether at a concentration of 0.05 to 0.3 M. In some embodiments, the fatty acid is present in the dialkyl ether at a concentration of 0.1 to 1 M.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
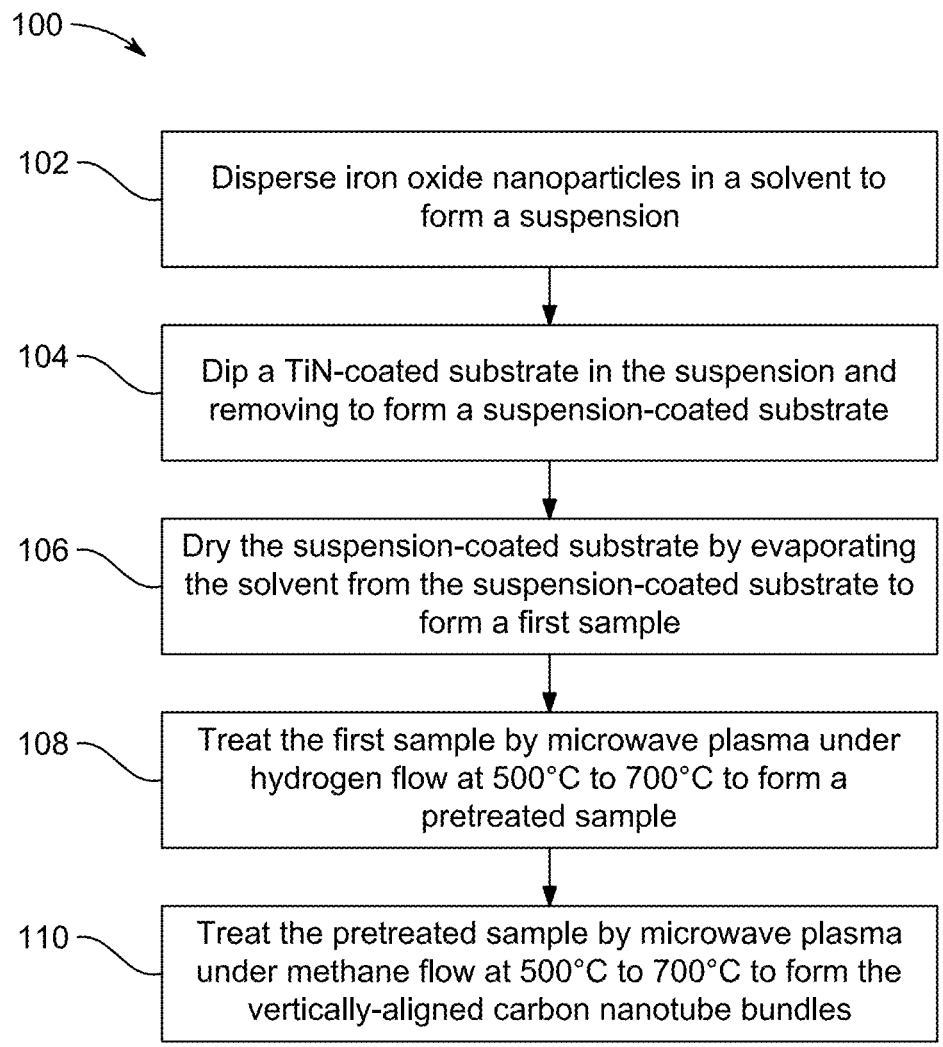
FIG. 1 is a schematic flow diagram of a method of making an array of vertically-aligned carbon nanotubes (CNT) bundles, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a method of densifying the growth of carbon nanotubes or CNTs by utilizing a colloidal catalyst and microwave plasma-enhanced chemical vapor deposition. The CNTs grown by the method of the present disclosure effectively realize the densification of nanotubes during growth in a reproducible and cost-effective manner.

Referring to FIG. 1, a flow diagram of method 100 of making an array of vertically-aligned carbon nanotube bundles is illustrated. The order in which method 100 is described is not intended to be construed as a limitation, and any number of the described method steps can be combined in any order to implement method 100. Additionally, individual steps may be removed or skipped from the method 100 without departing from the spirit and scope of the present disclosure.

At step 102, the method 100 includes dispersing iron oxide nanoparticles in a solvent to form a suspension. In an embodiment, the iron oxide nanoparticles are known to be paramagnetic (e.g., magnetite, $Fe_3O_4$ (which is sometimes represented as $FeO \cdot Fe_2O_3$), or maghemite, $Fe_2O_3$, or a combination of both). In a preferred embodiment, the iron oxide nanoparticles are nanoparticles of $Fe_3O_4$.

The iron oxide nanoparticles may be prepared by any methods conventionally known in the art. In an embodiment, the iron oxide nanoparticles are synthesized by mixing and dissolving a fatty acid in dialkyl ether to form a first mixture. In an embodiment, the fatty acid has a carbon chain ranging from 10 to 22 carbon atoms in length. In an embodiment, the fatty acid is oleic acid. In some embodiments, the oleic acid was used as a surfactant to prevent aggregation of the iron nanoparticles. The fatty acid was dissolved in the dialkyl ether to form the first mixture. In an embodiment, the dialkyl ether is a di-n-alkyl ether with a total of 12 to 36 carbon atoms. In an embodiment, the di-n-alkyl ether is at least one selected from the group consisting of di-n-octyl ether, di-n-decyl ether, di-n-nonyl ether, n-undecyl ether, di-n-dodecyl ether, n-hexyl n-octyl ether, n-octyl n-decyl ether, n-decyl n-undecyl ether, n-undecyl n-dodecyl ether, n-hexyl n-undecyl ether, di-tert-butyl ether, di-isopentyl ether, di-3-ethyl decyl ether, tert-butyl n-octyl ether, iso-pentyl n-octyl ether, 2-methylpentyl n-octyl ether. In a preferred embodiment, the dialkyl ether is dioctyl ether. In some further embodiments, the fatty acid is present in the dialkyl ether at a concentration of 0.1 to 1 M, preferably 0.2 to 0.85 M, preferably 0.3 to 0.7 M, preferably 0.4 to 0.55 M, or even more preferably 0.5 M. Other ranges are also possible.

In some embodiments, the method of preparing the iron oxide nanoparticles further includes heating the first mixture to a temperature range of 90 to 120° C., preferably 95 to 110° C., or more preferably at about 100° C.

In some embodiments, the method of preparing the iron oxide nanoparticles also includes mixing an iron precursor with the mixture after the heating and refluxing at 250 to 350° C., preferably 275 to 325° C., or even more preferably about 300° C. for 0.5 to 2 hours, preferably 0.6 to 1.8 hours, preferably 0.7 to 1.6 hours, preferably 0.8 to 1.4 hours, preferably 0.9 to 1.2 hours, or even more preferably about 1 hour to form a second mixture containing the iron oxide nanoparticles. Other ranges are also possible.

In some embodiments, the iron precursor is at least one selected from the group consisting of an iron complex, iron carbonyl, an iron salt, an iron salt of saturated or unsaturated fatty acid, an organic iron compound, and an iron sandwich complex. In an embodiment, the iron precursor is iron carbonyl. In some further embodiments, the iron carbonyl is at least one selected from the group consisting of iron dicarbonyl ($Fe(CO)_2$), iron tetracarbonyl ($Fe(CO)_4$), and iron pentacarbonyl ($Fe(CO)_5$). In some embodiments, the iron precursor is present in the dialkyl ether at a concentration of 0.05 to 0.3 M, preferably 0.075 to 0.25 M, preferably 0.1 to 0.2 M, or more preferably about 0.15 M. Other ranges are also possible.

In some embodiments, a molar ratio of iron precursor and dialkyl ether is 1:50 to 1:15, preferably 1:40 to 1:10, preferably 1:30 to 1:5, preferably 1:20 to 1:1, or even more preferably 1:10 to 1:1. Other ranges are also possible.

In some embodiments, a molar ratio of iron precursor and fatty acid is 1:1 to 1:10, preferably 1:2 to 1:9, preferably 1:3 to 1:8, preferably 1:3 to 1:7, preferably 1:4 to 1:6, or even more preferably about 1:5. Other ranges are also possible.

Moreover, the method of preparing the iron oxide nanoparticles further includes separating the iron oxide nanoparticles from the second mixture, washing and drying (to evaporate the solvent) to form the iron oxide nanoparticles. In some embodiments, the iron oxide nanoparticles have an average particle size of 5 to 35 nm, preferably 10 to 30 nm, preferably 15 to 25 nm, or even more preferably about 20 nm. In some preferred embodiments, the iron oxide nanoparticles have an inter-plane spacing of 0.05 to 0.5 nm, preferably 0.1 to 0.45 nm, preferably 0.15 to 0.4 nm, preferably 0.2 to 0.35 nm, or even more preferably 0.25 to 0.3 nm. In some further embodiments, the iron oxide nanoparticles are crystalline in nature. In some preferred embodiments, the particle size of the nanoparticles is controlled/altered by altering the ratio of iron, the precursor, and fatty acid in the dialkyl ether. Other ranges are also possible.

Figure 4:
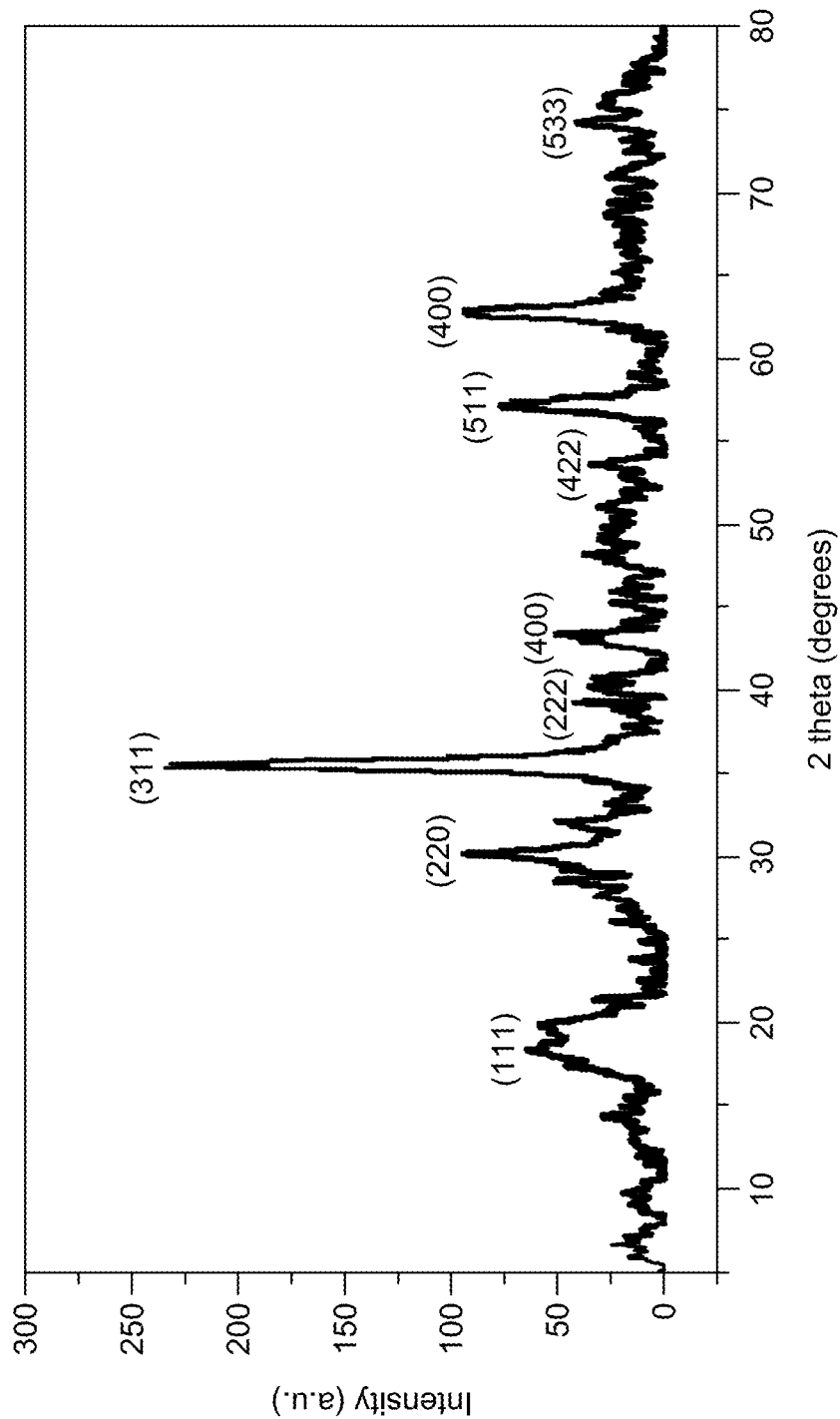
FIG. 4 shows an X-ray diffraction (XRD) pattern of the Fe$_3$O$_4$ nanoparticles powder, according to certain embodiments.

Referring to FIG. 4, the crystalline structures of the iron oxide nanoparticles is characterized by X-ray diffraction (XRD). In some embodiments, the XRD patterns are collected in a X'pert Pro X-ray diffractometer equipped with a Cu-Kα radiation source (λ=0.15406 nm) for a 2θ range extending between 10 and 80°, preferably 20 and 70°, further preferably 30 and 60° at an angular rate of 0.005 to 0.04° $s^{-1}$, preferably 0.01 to 0.03° $s^{-1}$, or even preferably 0.02° $s^{-1}$. In some embodiments, the iron oxide nanoparticles have a first intense peak with a 2 theta (θ) value in a range of 15 to 25° in an X-ray diffraction (XRD) spectrum, as depicted in FIG. 4. In some further embodiments, the iron oxide nanoparticles have at least a second intense peak with a 2θ value in a range of 25 to 40° in the XRD spectrum. In some more preferred embodiments, the iron oxide nanoparticles have at least a third intense peak with a 2θ value in a range of 55 to 65° in the XRD spectrum. Other ranges are also possible.

Figure 5:
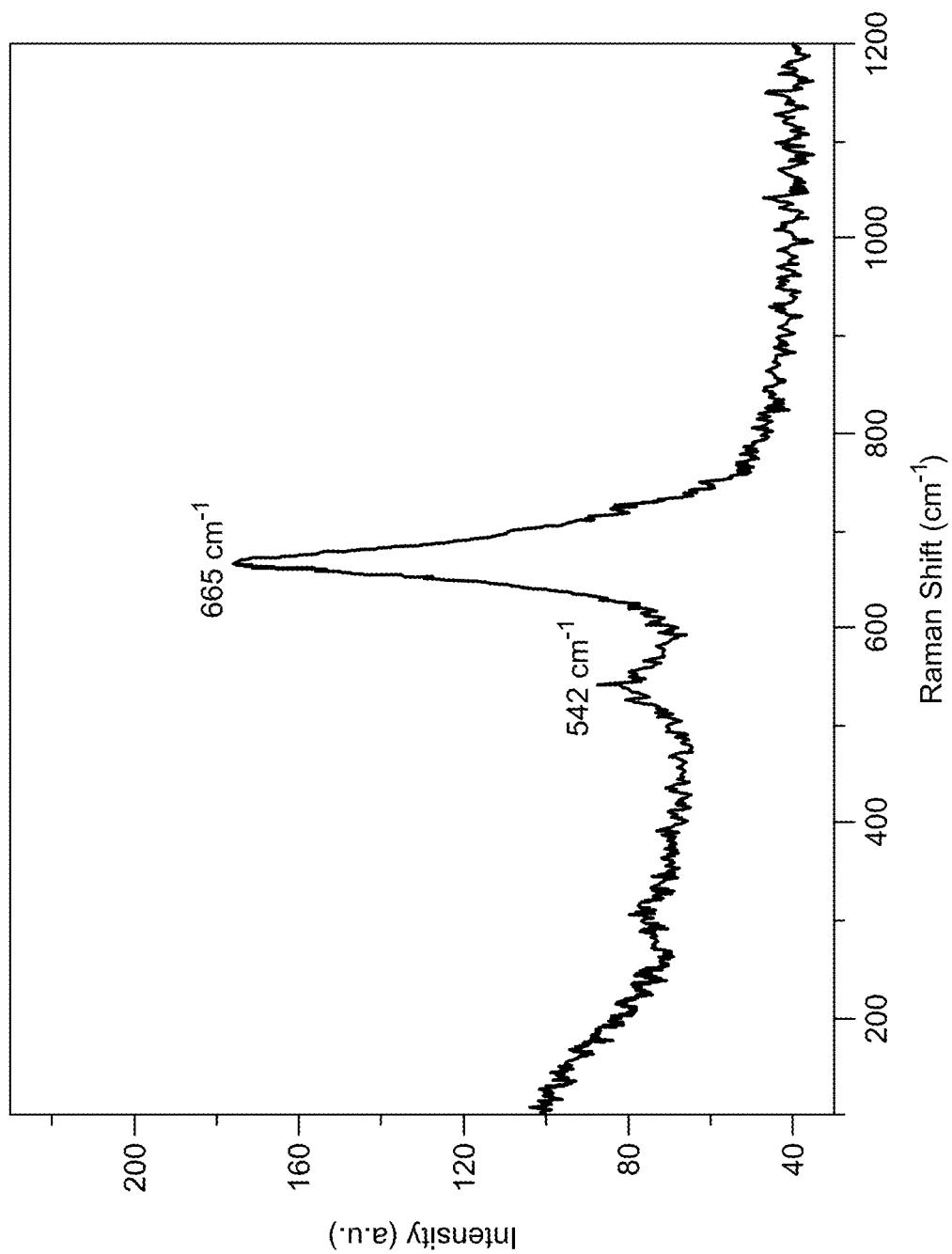
FIG. 5 shows a Raman spectrum of H$_2$ plasma-treated Fe$_3$O$_4$ nanoparticles at an excitation frequency of 532 nm, according to certain embodiments.

Additionally, the structure of the iron oxide nanoparticles is also characterized by the Raman spectroscopy as depicted in FIG. 5. Raman spectra of the iron oxide nanoparticles over the range of 100 to 1500 $cm^{-1}$ were obtained by using a Thermo Fisher Scientific DXR Raman microscope. A He—Ne laser source working at 17 mW and 532 nm excitation wavelength with 100% laser power was used for the measurements. An acquisition time of 25 s with 2 accumulations was set for the Raman spectra collection for bare and modified hematite films. In some embodiments, the iron oxide nanoparticles have at least one intense peak in a range of 400 to 600 $cm^{-1}$. In some further embodiments, the iron oxide nanoparticles have at least one intense peak in a range of 600 to 800 $cm^{-1}$. Other ranges are also possible.

In some embodiments, the prepared iron nanoparticles are further dispersed in a solvent to form a suspension. The solvent is at least one selected from the group consisting of hexane, cyclohexane, heptane, diethyl ether, butane, isobutylene, pentane, acetone, and dichloromethane. In a preferred embodiment, the solvent is hexane. Optionally, the suspension may be sonicated to prevent the agglomeration or aggregation of the iron nanoparticles.

In some embodiments, the iron nanoparticles are present in the suspension at a concentration of 0.005 to 0.2 mg/mL, preferably 0.01 to 0.1 mg/mL, preferably 0.02 to 0.05 mg/mL, or even more preferably about 0.033 mg/mL. Other ranges are also possible.

Agglomeration of the $Fe_3O_4$ nanoparticles can affect the properties of the CNTs. Agglomeration or aggregation of the $Fe_3O_4$ nanoparticles may result in difficulty dispersing the particles onto the TiN-coated substrate. It is therefore preferred that there is minimal or no aggregation of the particles. Little aggregation was observed in the $Fe_3O_4$ nanoparticles prepared by the method of the present disclosure.

At step 104, the method 100 includes dipping a TiN-coated substrate in the suspension and removing the TiN-coated substrate from the suspension to form a suspension-coated substrate. In some embodiments, the TiN-coated substrate may be formed by coating titanium nitride (TiN) at least partially over a substrate. In some embodiments, the suspension nanoparticles may cover at least 5% of a surface area of the TiN-coated substrate based on a total surface area, preferably at least 10%, preferably at least 30%, preferably at least 50%, preferably at least 70%, preferably at least 90%, based on the total surface area of the glass substrate. Other ranges are also possible.

Although, any of the conventional methods known in the art may be used to coat the substrate with the TiN, the method of the present disclosure uses an ion plating technique to coat the substrate. As used herein, the term "ion plating" or "ion plating technique" generally refers to a process that evaporated particles are positively charged by passing them through the plasma, and a negative charge is applied to the substrate to attract the evaporated particles to be deposited to form a film on a surface of the substrate.

As used herein, the term "chemical vapor deposition" or "CVD" refers to a vapor deposition process wherein the desired layer is deposited on the substrate from vaporized metal-containing compounds (and any reaction gases used) within a deposition chamber with no effort made to separate the reaction components.

The substrate selection criteria may include, but is not limited to, it should be capable of supporting the growth of CNTs. Secondly, it should be capable of withstanding the pyrolysis or CVD conditions employed for the growth of CNTs. Examples of suitable substrates include all types of glass that provide sufficient thermal stability according to the synthesis temperature applied, such as quartz glass, mesoporous silica, silicon water, nanoporous alumina, ceramic plates, graphite, and mica.

The substrate may also be one of the substrates described, which has been coated with a metal, metal oxide, metal nitride, metal alloy, or compound thereof, which may have conducting or semiconducting properties. Examples of suitable metals include Au, Pt, Cu, Cr, Ni, Fe, Co, and Pd. In some embodiments, the substrate may also be coated with a metal oxide, such as a fluorine doped tin oxide (FTO) coated glass substrate, a tin-doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate, or a semiconductor material, such as gallium arsenide, aluminum arsenide, aluminum sulphide, or gallium sulphide. In some preferred embodiments, the substrate may also be coated with a metal nitride. In some further preferred embodiments, the metal nitride is any one of vanadium nitride, chromium nitride, titanium nitride, molybdenum nitride, or a combination thereof. In a most preferred embodiment, the substrate is made of stainless steel. The stainless steel has a thickness of about 0.5-1.0 mm, more preferably about 0.7 mm. Other substrates are also possible.

The TiN-coated substrate is dipped in the suspension containing the iron oxide nanoparticles, such that the TiN-coated substrate is deposited partially or wholly with at least one layer of the $Fe_3O_4$ nanoparticles in a uniform and continuous manner. It was exposed to the environment until all the solvent in the suspension was evaporated, leaving behind a coat of iron oxide nanoparticles on the TiN-coated substrate. In another embodiment, the suspension may be sprayed onto the TiN-coated substrate and left to air dry to obtain the suspension-coated substrate.

In some embodiments, the average number density of the iron oxide nanoparticles on a surface of the TiN-coated substrate is in a range of 800 to 1,200 particles per square micrometer (particles/$\mu m^2$), more particularly about 900-1000 particles/$\mu m^2$ of the TiN-coated substrate. In a specific embodiment, the average number density of the iron oxide nanoparticles on the surface of the TiN-coated substrate is 945 particles/$\mu m^2$ of the TiN-coated substrate. Other ranges are also possible.

At step 106, the method 100 includes drying the suspension-coated substrate by evaporating the solvent from the suspension-coated substrate to form a first sample. Any traces of the solvent herein present on the suspension-coated substrate are further evaporated by drying the suspension-coated substrate. In an embodiment, the suspension-coated substrate may be dried by heating/oven drying at a temperature range of 60-120° C., preferably 65-110° C., preferably 70-100° C., preferably 75-90° C., or even more preferably 80° C. to obtain the first sample. Other ranges are also possible.

At step 108, the method 100 includes treating the first sample with microwave plasma under hydrogen flow at 500 degrees centigrade (° C.) to 700° C. to form a pre-treated sample. The purpose of heating the first sample to a high temperature is to ensure complete evaporation/removal of organic material such as solvents. It is desirable to carry out such heating in the microwave plasma to avoid oxidation of magnetite particles to other states such as, $\gamma$-$Fe_2O_3$.

In some embodiments, the hydrogen flow is preferably carried out at 600° C. to form the pre-treated sample. The hydrogen flow is introduced onto the first sample at a rate of 50 to 150 standard cubic centimeters per minute (sccm), preferably 70 to 130 sccm, preferably 90 to 110 sccm, or more preferably 100 sccm under a pressure of 4 to 10 kilopascals (kPa), preferably 5 to 9 kPa, preferably 6 to 8 kPa, or more preferably about 7 kPa with a microwave power of 500 to 1500 Watt (W), preferably 700 to 1300 W, preferably 900 to 1100 W, or more preferably about 1000 W for 5 to 30 minutes, preferably 10 to 25 minutes, or more preferably about 15 minutes. In a preferred embodiment, hydrogen flow is introduced onto the first sample at a rate of 100-120 sccm under a pressure of about 7-8 kPa with a microwave power of about 900-1100 W for 10-20 minutes. The pyrolysis conditions, such as flow rate, temperature, pressure, and microwave power, may be altered depending on the desired length, type, and density of the CNTs. A person skilled in the art may be able to alter the pyrolysis conditions depending on the density and type of CNTs required. Other ranges are also possible.

Figure 6A:
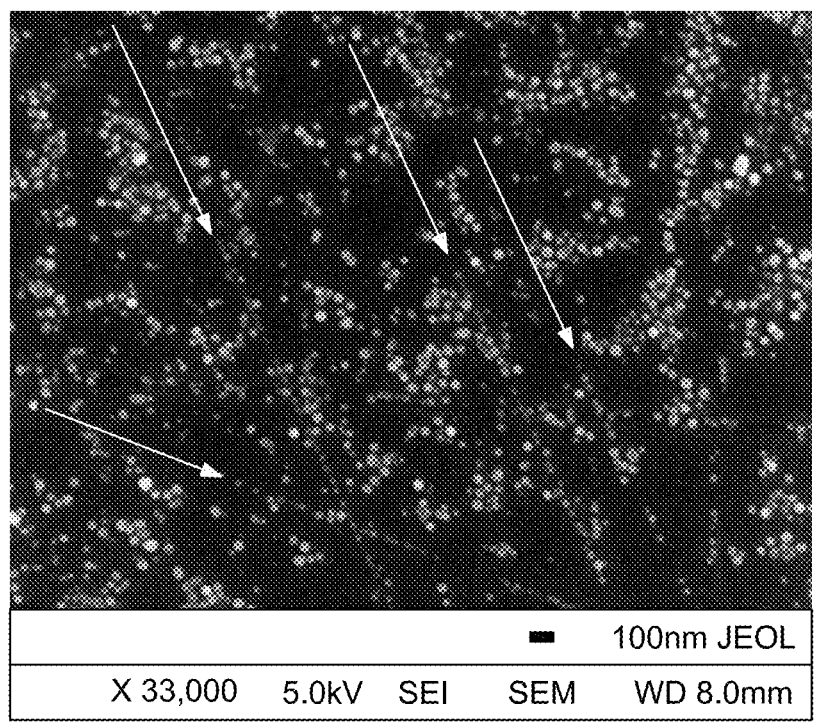
FIGS. 6A and 6B show scanning electron microscope (SEM) images of deposited Fe$_3$O$_4$ nanoparticles, according to certain embodiments.
Figure 6B:
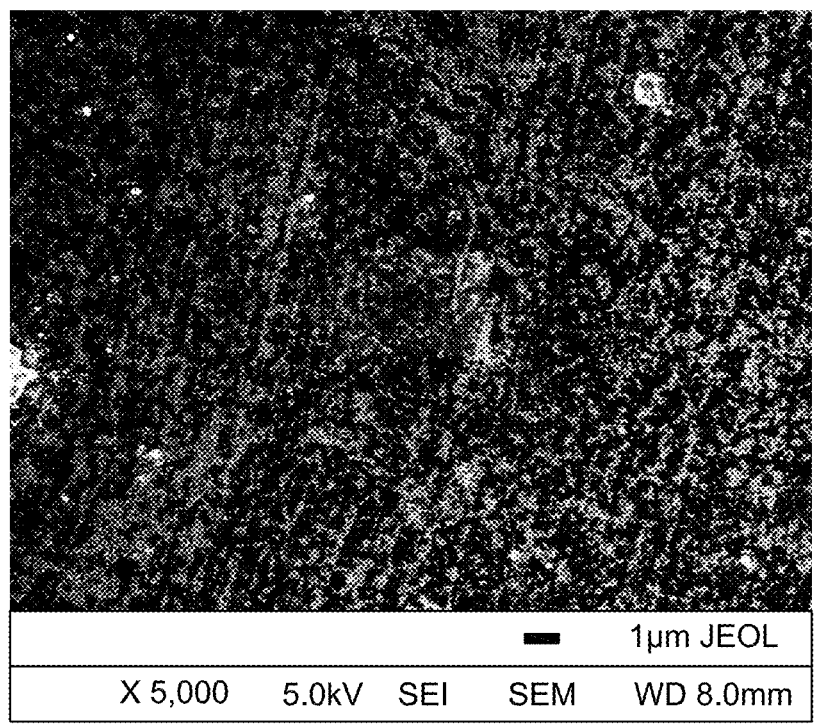

In some embodiments, the iron oxide nanoparticles may be distributed substantially along a straight line pattern parallel to the substrate surface left from the ion plating method, as depicted in FIGS. 6A and 6B. In some preferred embodiments, the iron oxide nanoparticles are evenly distributed on the surface of the substrate. In some further embodiments, the iron oxide nanoparticles may form aggregates on the surface of the substrate.

At step 110, the method 100 includes treating the pre-treated sample with microwave plasma under methane flow at 500° C. to 700° C., or more preferably about 600° C. to form the vertically aligned carbon nanotube bundles. The methane flow is introduced onto the pre-treated sample at a rate of 5 to 50 sccm. One of the critical factors that affect the growth of the CNTs is the ratio of methane to hydrogen flow rate ratio. In an embodiment, the percentage of methane to hydrogen flow rate ratio is 1:5.

Optionally, a suitable catalyst may be used to carry out the process of synthesizing vertically aligned CNTs from iron nanoparticles. Examples of suitable catalysts include, but are not limited to, transition metals, such as Fe, Co, Al, Ni, Mn, Pd, Cr, or alloys thereof in any suitable oxidation state.

The vertically-aligned CNT bundles, prepared by the method of the present disclosure, have ends opposite to where the CNT bundles are attached; and are twisted into helical configurations. In an embodiment, the vertically-aligned CNT bundles further include cauliflower-shaped aggregates formed at the ends of the helical configurations of the bundles. The cauliflower-shaped aggregates have an average particle size of 5 to 35 nm. Further, they have an average density of $3\times10^9$ to $5\times10^9$ bundles per square meter (bundles/$m^2$) of the CNT bundles on the surface of the TiN-coated substrate, preferably $3.2\times10^9$ to $4.8\times10^9$ bundles/$m^2$, preferably $3.4\times10^9$ to $4.6\times10^9$ bundles/$m^2$, preferably $3.6\times10^9$ to $4.4\times10^9$ bundles/$m^2$, preferably $3.8\times10^9$ to $4.2\times10^9$ bundles/$m^2$, or even more preferably about $4.0\times10^9$ bundles/$m^2$, based on the surface of the TiN-coated substrate. In some embodiments, the average nearest distance between the CNT bundles is in a range of 10 to 20 micrometers ($\mu m$), preferably about 12 to 18 $\mu m$, preferably about 14 to 16 $\mu m$, or even more preferably about 15 $\mu m$. However, in some embodiments, the site density of the CNT bundles and hence the inter-bundle distance might be slightly changed by altering the concentration of particle suspension. Other ranges are also possible.

In some embodiments, the CNTs thus formed include multiwall carbon nanotubes (MWCNTs). In some preferred embodiments, the MWCNTs have an average number of 3 to 20 walls per MWCNT, preferably 5 to 18 MWCNT, preferably 7 to 16 MWCNT, preferably 9 to 14 MWCNT, or even more preferably 11 to 12 MWCNT. In some further preferred embodiments, the MWCNTs have an average inner diameter in a range of 7 to 13 nm, preferably 7.5 to 12.5 nm, preferably 8 to 12 nm, preferably 8.5 to 11.5 nm, preferably 9 to 11 nm, or even more preferably 9.5 to 10.5 nm. In some more preferred embodiments, the MWCNTs have an average outer diameter in a range of 10 to 16 nm, preferably 11 to 15 nm, preferably 12 to 14 nm, or even more preferably about 13 nm. In some most preferred embodiments, the MWCNTs have an average height in a range of 14 to 23 $\mu m$, preferably 16 to 21 $\mu m$, preferably 17 to 20 $\mu m$, or even more preferably 18 to 19 $\mu m$. Other ranges are also possible.

Figure 11:
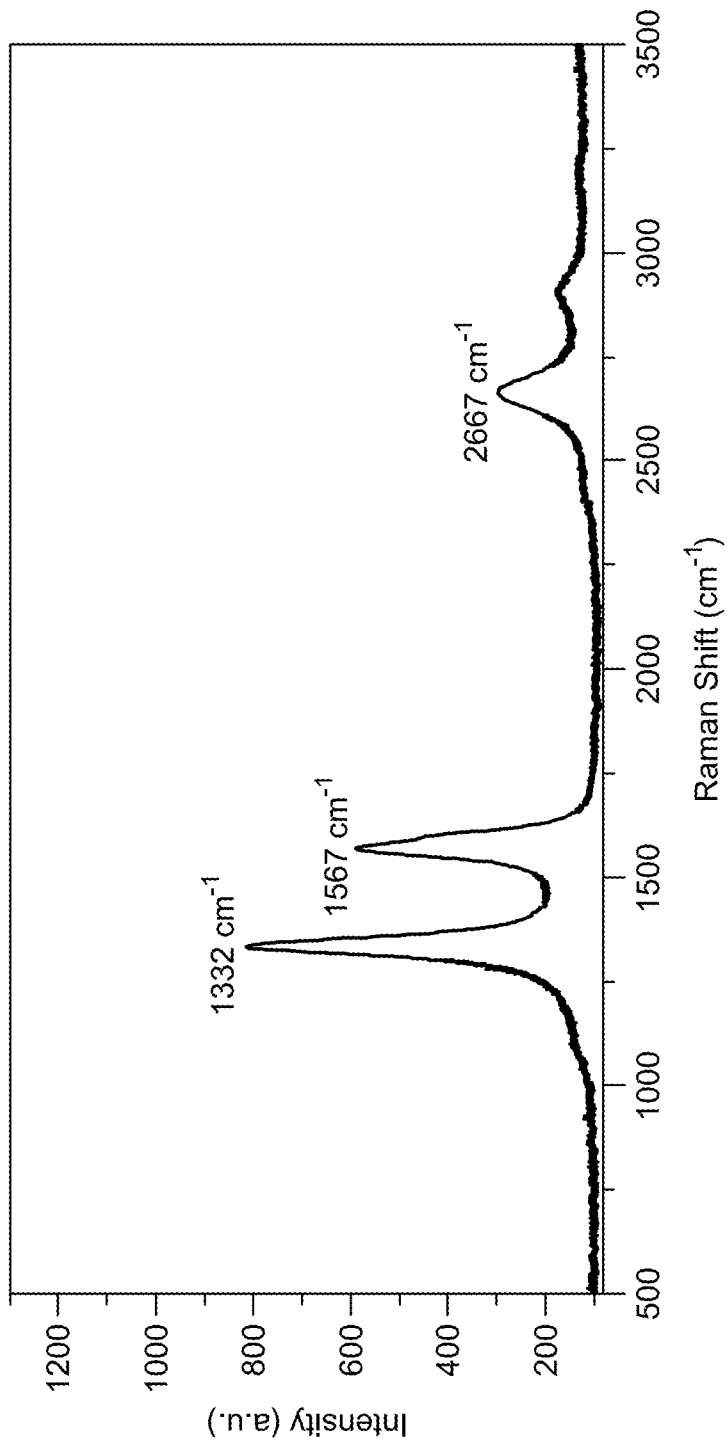
FIG. 11 shows a Raman spectrum of CNT bundles, according to certain embodiments.

Referring to FIG. 11, the vertically-aligned CNT bundles have at least one intense peak in a range of 1000 to 1400 $cm^{-1}$ in a Raman spectra. In some further embodiments, the CNT bundles have at least one intense peak in a range of 1450 to 1650 $cm^{-1}$ in the Raman spectra. In some further preferred embodiments, the CNT bundles have at least one intense peak in a range of 2500 to 3000 $cm^{-1}$ in the Raman spectra. Other ranges are also possible.

The vertically aligned CNTs prepared by the method of the present disclosure find application in electrodes, nanotube capacitors, optoelectronic devices, sensors, field emission transistors, and energy-absorbing materials.

EXAMPLES

The disclosure will now be illustrated with working examples, which are intended to illustrate the working of disclosure and not intended to restrictively imply any limitations on the scope of the present disclosure. The working examples depict a method of making an array of vertically-aligned CNT bundles of the present disclosure.

Example 1: Materials and Synthesis

The colloidal catalyst nanoparticles were synthesized by thermal decomposition of iron carbonyl in octyl ether solvent [Hyeon, T., Lee, S. S., Park, J., Chung, Y. & Na, H. B. Synthesis of highly crystalline and monodisperse maghemite nanocrystallites without a size-selection process. *J. Am Chem. Soc.* 123, 12798-12801 (2001), which is incorporated herein by reference in its entirety]. Briefly, 1.28 g of oleic acid was dissolved in 10 mL of octyl ether, and the solution was heated on a hot plate and stirred. When the temperature stabilized at 100° C., 0.2 mL of iron carbonyl was added. The resultant yellowish solution was heated gradually at about 300° C. for 1 h to reflux. At that point, the color turned black, which indicates the formation of $Fe_3O_4$ nanoparticles. The black particle suspension was centrifuged, washed with ethanol, and then dispersed in hexane.

For the growth of CNTs, a commercially available TiN-coated stainless-steel sheet (thickness: 0.7 mm) was cut into squares (1 cm×1 cm) as substrates. They were placed at the bottom of a beaker, and the catalyst particle suspension (0.033 mg/mL or $10^{12}$ particle/$cm^3$) was poured until the substrate was just covered at 1 mm. The beaker was exposed to the environment at room temperature until all the hexane evaporated, resulting in a coat of particles on the substrate surface of site density ~945 particles/$\mu m^2$. The substrate was then placed in a microwave plasma-enhanced chemical vapor deposition (MW-PECVD) chamber (HPMS-2020, Chengdu Newman-Hueray Microwave Tech. Co., Ltd., China), and heated using $H_2$ plasma at 600° C. for 10 min at 7 kPa of pressure, 1000 W of microwave power, and 100 sccm flow rate of hydrogen gas. This was followed by the growth step, where methane was introduced to the chamber at a flow rate of 20 sccm for another 10 minutes while keeping other parameters unchanged.

Example 2: Instrumentation

FE-SEM (JSM-7600F, JEOL) was employed to image the particle-covered substrate before and after CNT growth. High-resolution TEM (JEOL-JSM-200 KV-Japan) was used to confirm the particle size and their crystallinity, nanotube diameter and the number of walls therein, and catalyst-tubes structure. A Raman spectrometer (DXR Raman microscope, Thermo Fisher Scientific, USA) was employed to confirm the graphitic and dislocation modes of the grown CNTs and verify the phase of $Fe_3O_4$ nanoparticles. The crystalline structure of these nanoparticles was explored using X-ray diffraction (XRD; X'pert Pro).

Figure 2A:
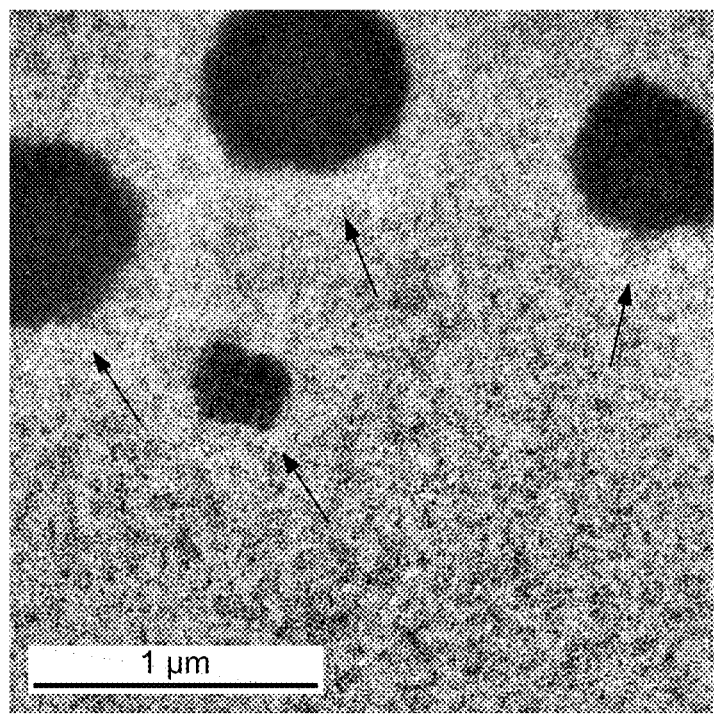
FIGS. 2A and 2B show transmission electron microscope (TEM) images of iron oxide nanoparticles at different magnifications, according to certain embodiments.
Figure 2B:
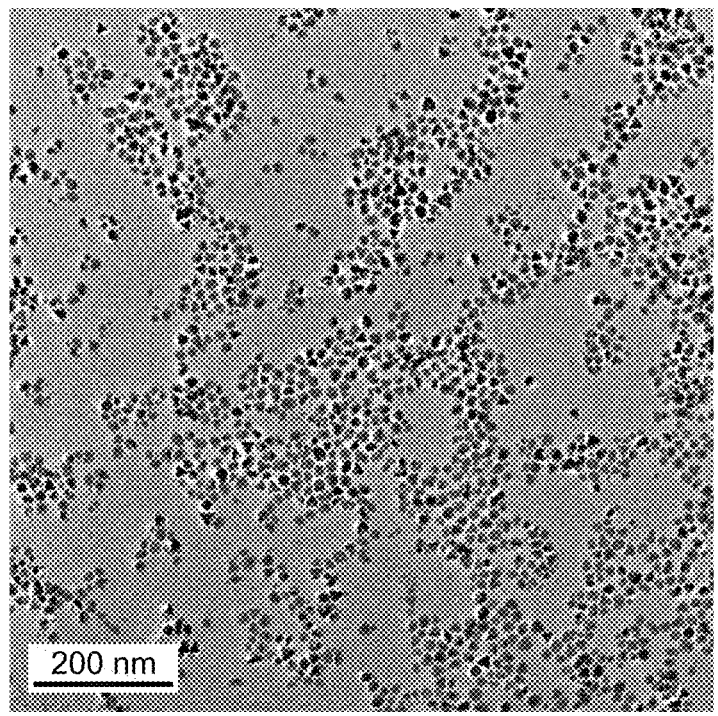
Figure 3:
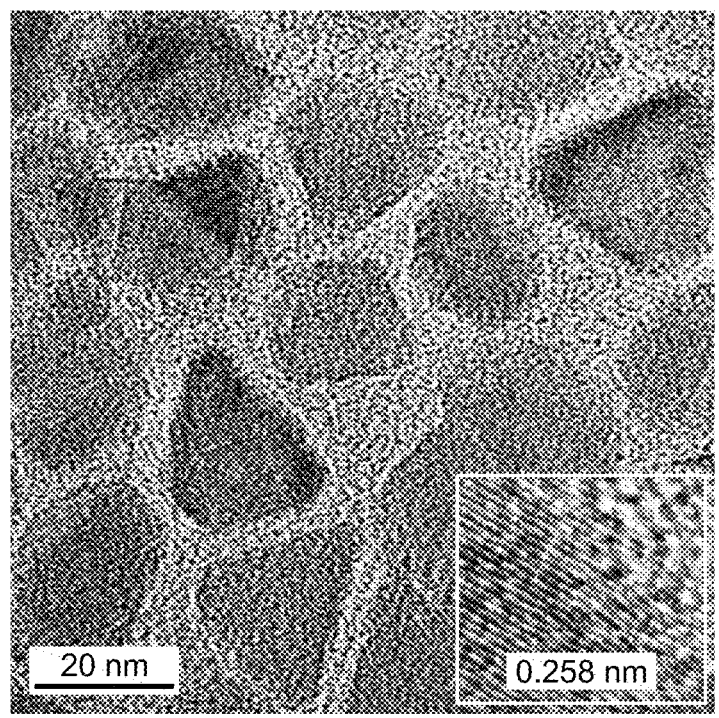
FIG. 3 shows a high-resolution TEM image of Fe$_3$O$_4$ nanoparticles, according to certain embodiments.

Example 3: Synthesis of $Fe_3O_4$ Nanoparticles and Their Deposition on the Substrate Iron oxide nanoparticles were synthesized by thermal decomposition of iron carbonyl in a solvent with a high boiling point [Hyeon, T., Lee, S. S., Park, J., Chung, Y. & Na, H. B. Synthesis of highly crystalline and monodisperse maghemite nanocrystallites without a size-selection process. *J. Am Chem. Soc.* 123, 12798-12801 (2001), which is incorporated herein by reference in its entirety]. FIGS. 2A and 2B show TEM images of the obtained nanoparticles at two different magnifications. Despite the sonication process in hexane, large aggregates of particles approximately 1 μm in size (indicated with arrows in FIG. 2A) still existed. FIG. 2B shows particles of almost identical sizes, which were separated from each other due to the use of oleic acid as a surfactant. The high-magnification image (FIG. 3) clearly shows the shape of the iron oxide nanoparticles with an average size of approximately 20 nm. The inset in FIG. 3 indicates an inter-plane spacing of 0.258 nm that corresponds to the (3 1 1) planes in $Fe_3O_4$ [Li, Z. et al. Solvothermal synthesis of nitrogen-doped graphene decorated by superparamagnetic $Fe_3O_4$ nanoparticles and their applications as enhanced synergistic microwave absorbers. *Carbon N. Y.* 115, 493-502 (2017), which is incorporated herein by reference in its entirety].

To investigate the crystalline structure and phase of the particles, their XRD pattern was collected employing the powder mode setup. The obtained pattern (FIG. 4) shows diffraction peaks corresponding to $Fe_3O_4$ in the covered range (PDF-Card no. 00-001-1111). Another effective and complementary method to confirm the phase of iron oxide nanoparticles is Raman scattering as all the phases of iron oxides and iron oxyhydroxides exhibit distinct Raman spectra [de Faria, D. L. A., Silva, S. V. & de Oliveira, M. T. Raman microspectroscopy of some iron oxides and oxyhydroxides. *J. Raman Spectrosc.* 28, 873-878 (1997), which is incorporated herein by reference in its entirety]. FIG. 5 shows the Raman spectrum of $Fe_3O_4$ nanoparticles under 532 nm excitation, where the strong peak at 665 $cm^{-1}$ and a small peak at 542 $cm^{-1}$ agreed with the reported spectrum of magnetite.

Figure 7:
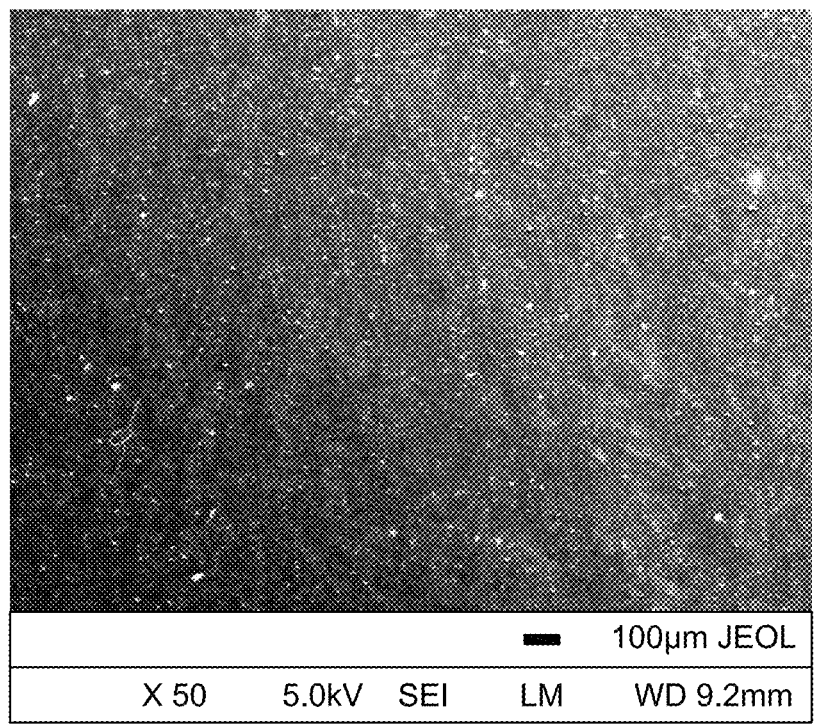
FIG. 7 is a plot depicting distribution of magnetite nanoparticles over a substrate, according to certain embodiments.

A commercially available Ti-coated stainless steel was placed at the beaker bottom, and a colloidal catalyst particle suspension was poured until reaching about 1 mm above the substrate surface. After the solvent evaporated at room temperature, a high-temperature treatment was carried out to eliminate the organic material completely. However, the heating must be carried out under an inert gas or hydrogen environment to avoid further oxidizing nanoparticles into other phases of iron oxide (e.g., $\gamma$-$Fe_2O_3$) [Gallagher, K. J., Feitknecht, W. & Mannweiler, U. Mechanism of oxidation of magnetite to $\gamma$-$Fe_2O_3$. *Nature* 217, 1118-1121 (1968), which is incorporated herein by reference in its entirety]. Hence, the microwave plasma-enhanced chemical vapor deposition (MW-PECVD) chamber was used, and hydrogen plasma was generated at a constant temperature of 600° C. for 10 minutes. This completely evaporated the organic material, and the nanoparticles could be imaged using SEM (FIG. 6A and FIG. 6B). Notably, significant patterning in the particle distribution was seen. FIG. 6A shows the nanoparticles forming parallel strips due to the parallel patterned substrate surface left from the ion plating method [Prokudina, V. K. Titanium Nitride. In *Concise Encyclopedia of Self-Propagating High-Temperature Synthesis* (eds. Borovinskaya, I. P. et al.) 398-401 (Elsevier: Amsterdam, 2017), which is incorporated herein by reference in its entirety]. A lower-magnification image (FIG. 6B) shows the collective effect of this process over a larger area. Despite the overall even distribution, some aggregations (bright dots) in the larger field-of-view image (FIG. 7) could be seen, which might be induced by lumps of organic materials in the aggregates (indicated with arrows in the TEM image of FIG. 2).

Example 4: Growth and Densification of CNTs

Figure 8A:
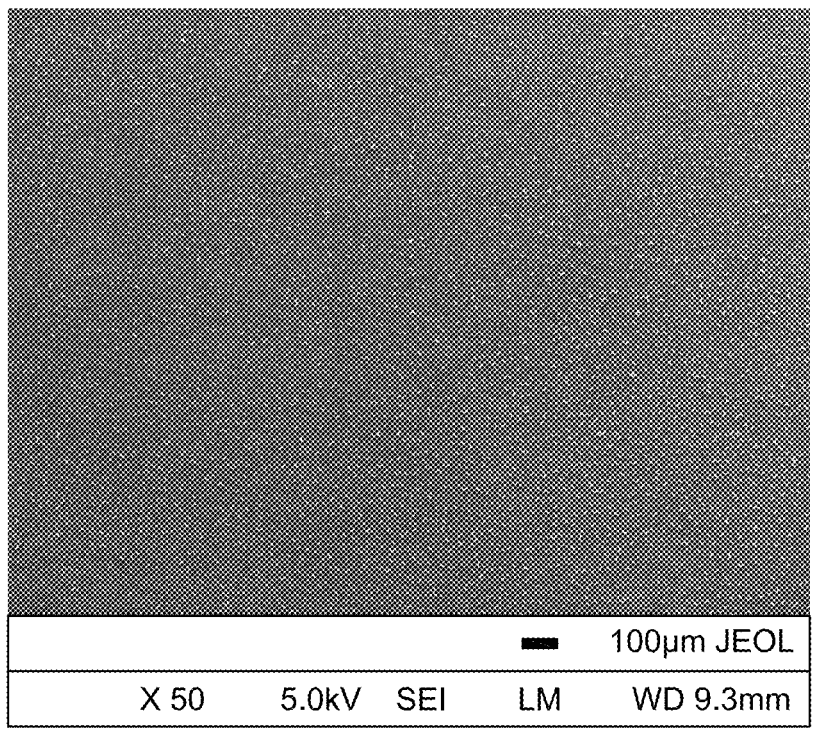
FIGS. 8A, 8B, and 8C show the distribution of the magnetite nanoparticles and their aggregation in the early stage (~one minute of growth) at different magnifications, according to certain embodiments.
Figure 8B:
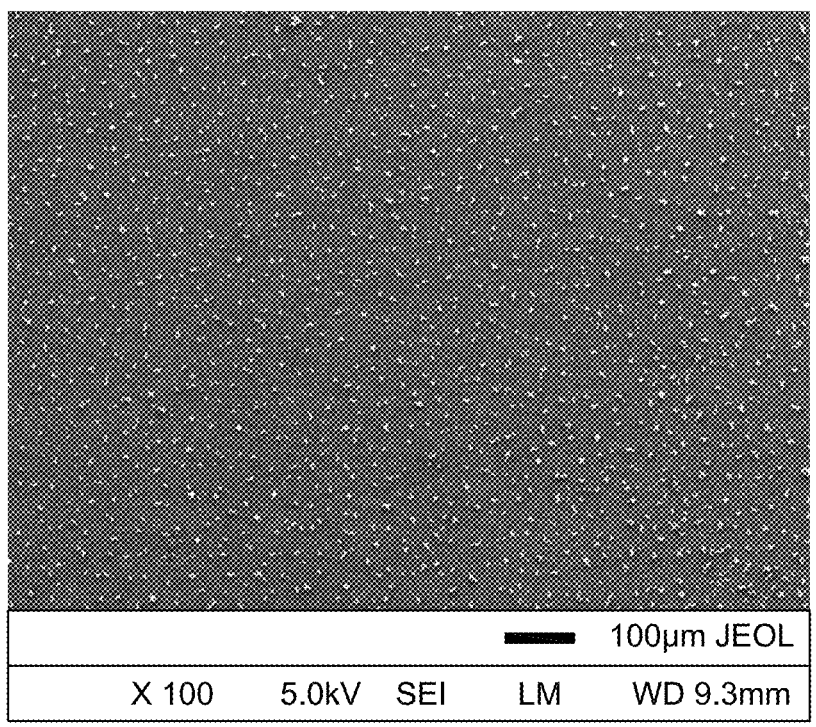
Figure 8C:
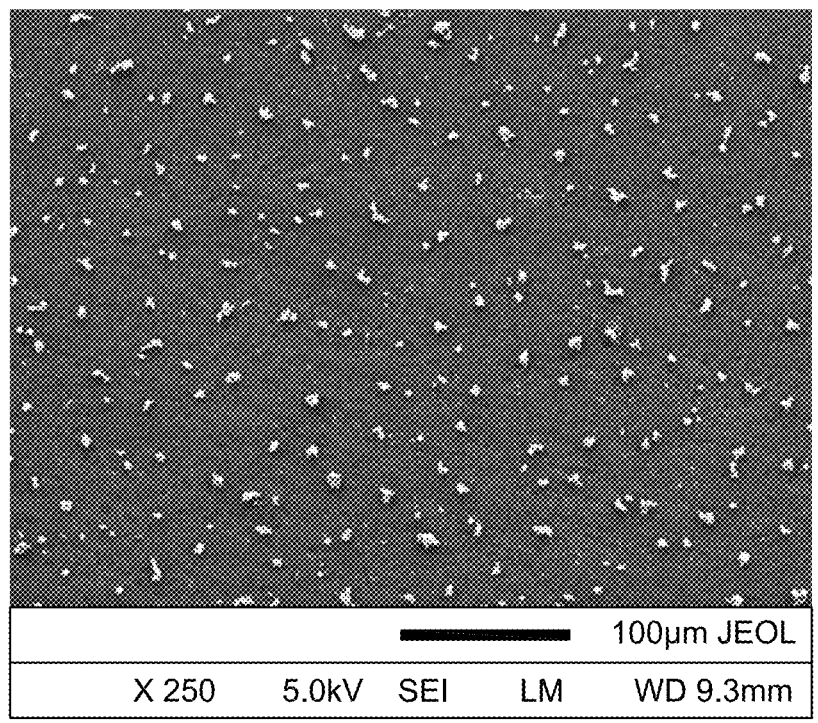
Figure 9A:
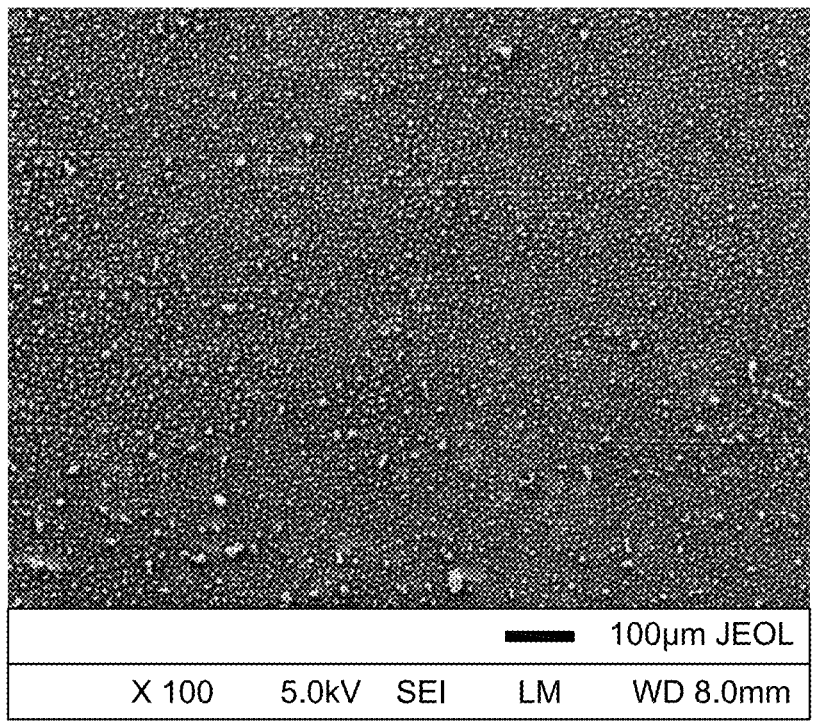
FIGS. 9A, 9B, 9C, and 9D show a top-view SEM images of the CNT film at different magnifications, according to certain embodiments.
Figure 9B:
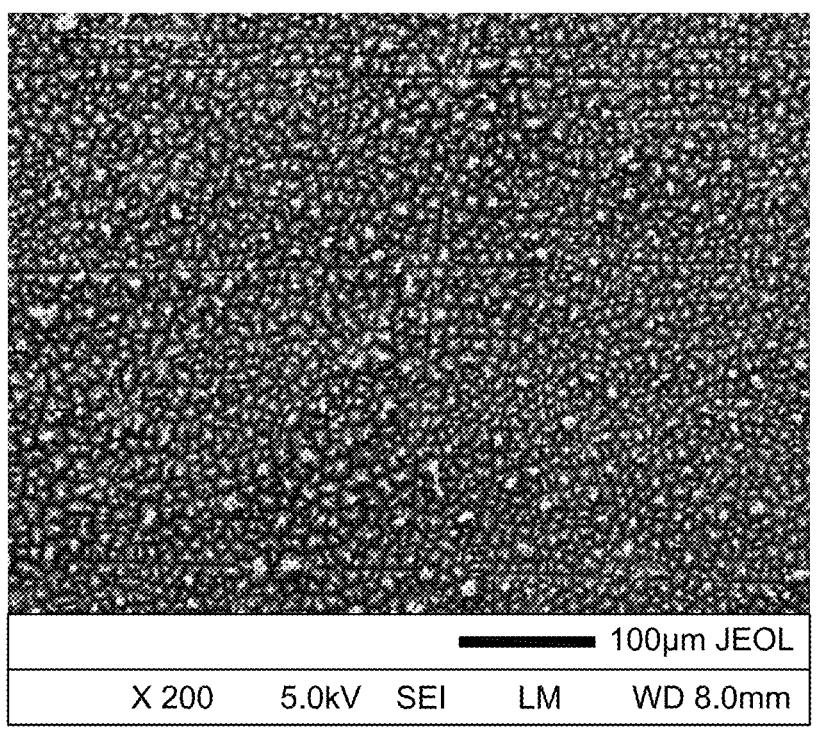
Figure 9C:
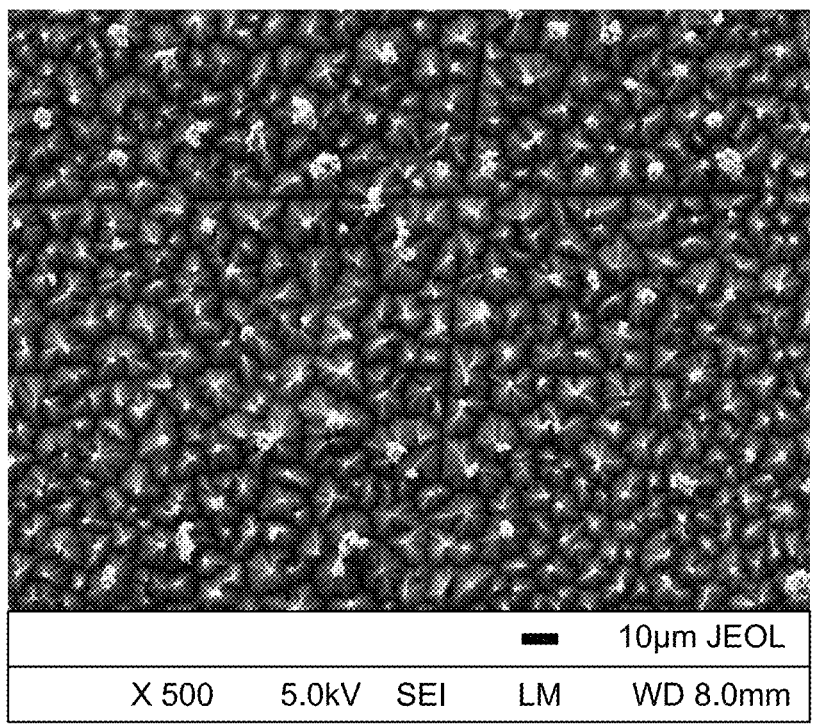
Figure 9D:
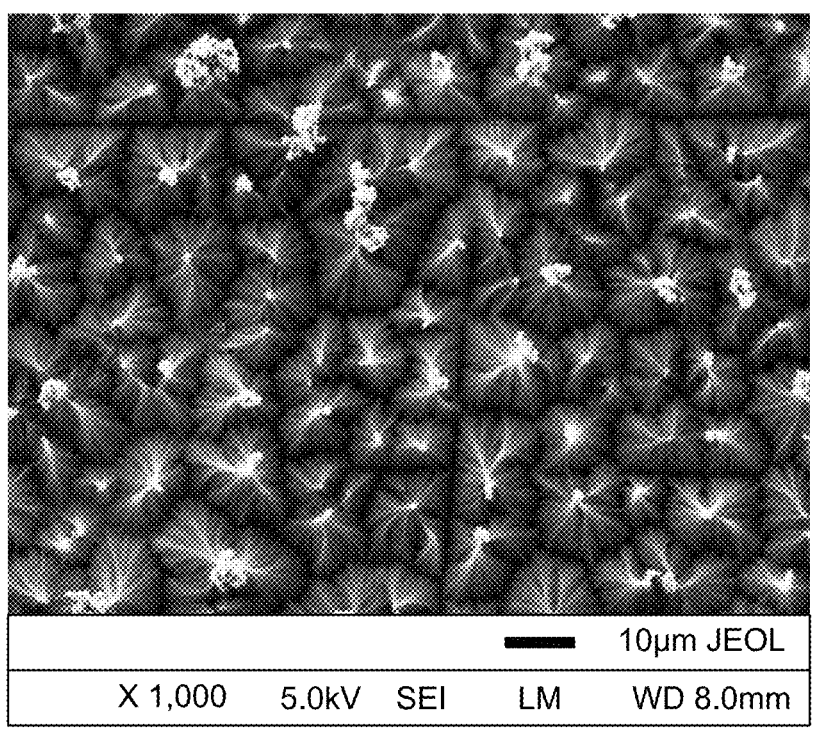

The CNTs grew in a tip growth mechanism, in which the catalyst particle stays at the upper end of the growing tube. Under this mechanism, the particles move in two degrees of freedom atop the CNT film during the growth: being lifted by the tubes and moving sideways. In the early stage (~one minute of growth), the particle agglomerates are distributed in a random yet uniform manner over large areas (FIG. 8). The particle lumps (indicated by arrows in FIG. 2 and shown in FIG. 7) are hypothesized to aggregate further and collect smaller particles as the tubes grow.

Figure 10A:
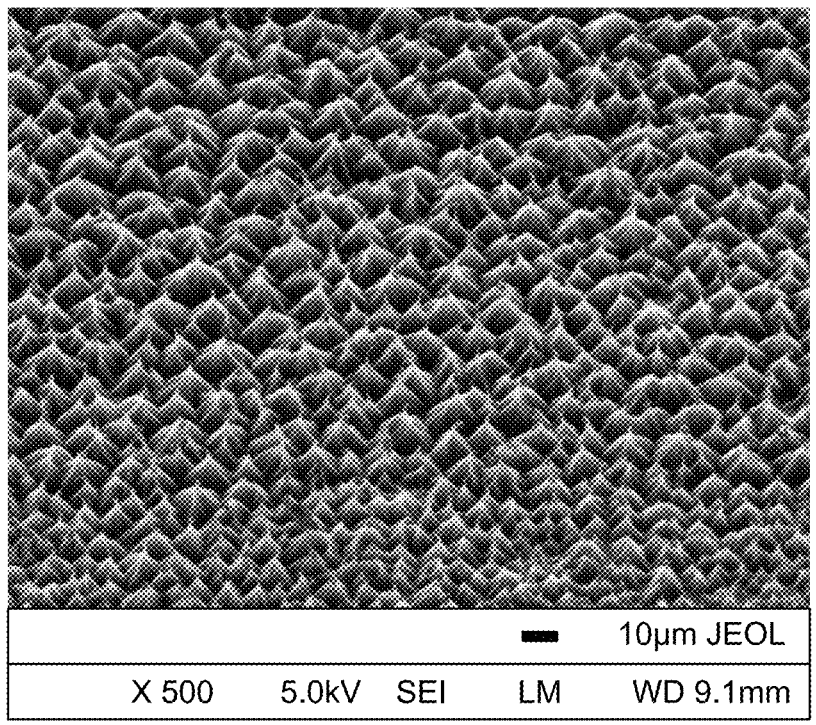
FIGS. 10A to 10C show a tilted-view SEM images of the grown CNTs at different magnifications, according to certain embodiments.
Figure 10B:
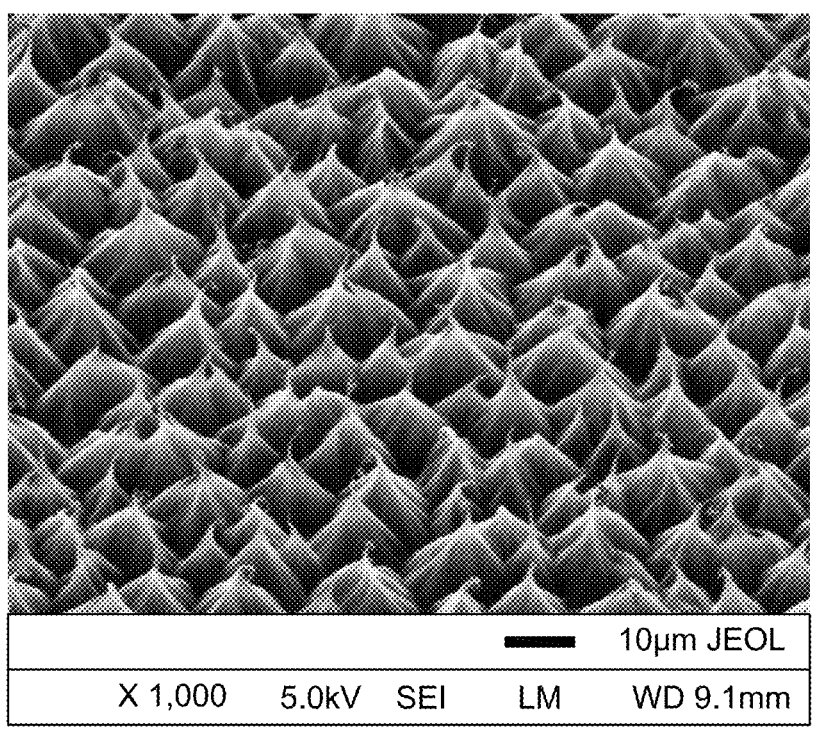
Figure 10C:
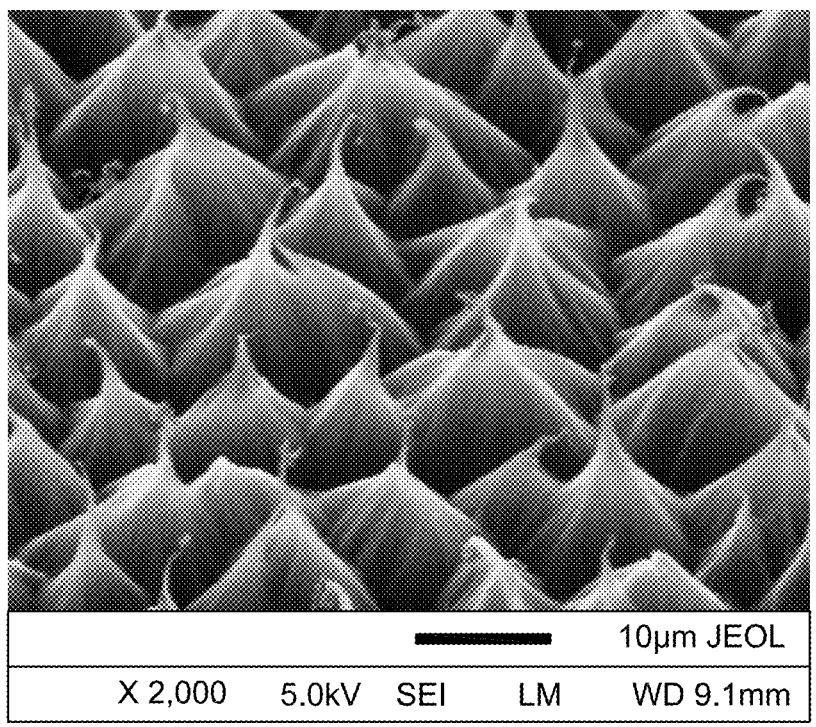

The MW-CVD approach led to a highly reproducible pattern of the densification mechanism of CNTs during their growth. FIG. 9A-FIG. 9D show the top-view images of the grown CNT bundles at different magnifications. The average number of bundles per area is about $5\times10^9$ m$^{-2}$, which corresponds to an inter-bundle distance of about 14 µm. However, in principle, the site density of the bundles and hence the inter-bundle distance might be slightly changed by altering the concentration of particle suspension. Although the bundle centers are randomly distributed, their site density over a large area is roughly uniform. Another noticeable feature is the parallel lines that separate the bundles in some areas, which might result from the ion plating of the TiN coating, as mentioned earlier [Prokudina, V. K. Titanium Nitride. In *Concise Encyclopedia of Self-Propagating High-Temperature Synthesis* (eds. Borovinskaya, I. P. et al.) 398-401 (Elsevier: Amsterdam, 2017), which is incorporated herein by reference in its entirety]. This effect may serve as a tool in the future to control the bundle distribution more precisely by patterning the substrate with coating. The tilted views (tile angle: 51.7° in FIG. 10) indicate that the bundle height was about 17 µm.

The Raman spectrum of the nanotubes using the 532 nm excitation is shown in FIG. 11. The characteristic peaks of MW-CNTs appear at 1567, 1332, and 2667 cm$^{-1}$. The first peak, known as the G band, corresponds to the in-plane vibrational mode of the carbon-carbon bond in the graphite structure. The disorders and dislocations contribute to the second peak, known as the D band. The small peak at 2667 cm$^{-1}$ is called the 2D band or the G' band, which is associated with the overtone of the disorders [Jorio, A., Dresselhaus, M. S., Saito, R. & Dresselhaus, G. *Raman Spectroscopy in Graphene Related Systems* (Wiley VCH Verlag: Weinheim, 2011), which is incorporated herein by reference in its entirety]. The ratio of the two peaks' intensities $I_G/I_D$ reveals the low quality of the grown nanotubes. However, in principle, such characteristics can be further improved by altering growth parameters.

Figure 12A:
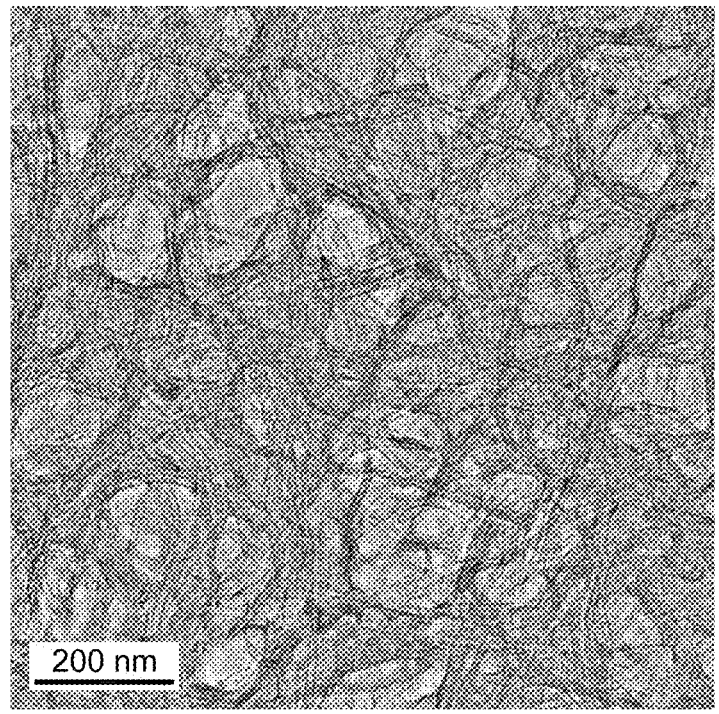
FIG. 12A shows a low-magnification TEM image of multiwall carbon nanotubes (MWCNTs) showing a narrow distribution of nanotube diameters, according to certain embodiments.
Figure 12B:
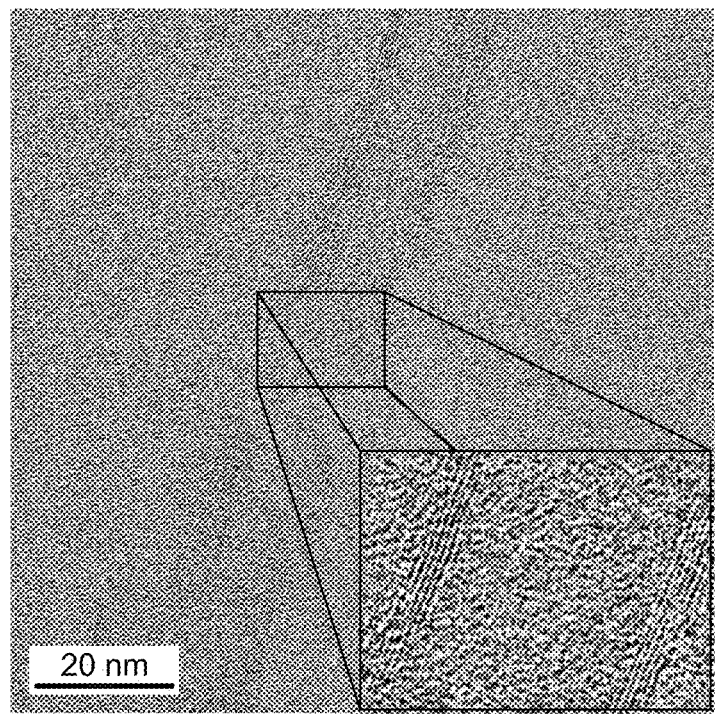
FIG. 12B shows a high-magnification TEM image of the MWCNTs showing the narrow distribution of nanotube diameters, according to certain embodiments.

The Raman spectrum does not provide conclusive evidence for the growth of MW-CNTs as graphite could also give similar results. To further investigate this, TEM was used to measure the tube diameter and number of walls. FIG. 12A and FIG. 12B presents two TEM images of the grown CNTs. The low-magnification image (FIG. 12A) provides a large field of view with a dense collection of nanotubes, where the even size of catalyst particles led to a narrow distribution of tube diameters. The average inner and outer diameters are about 10.5 and 14 nm, respectively, as seen in FIG. 12B and fewer than 10 walls were counted (as can be observed from the magnified inset).

Figure 13A:
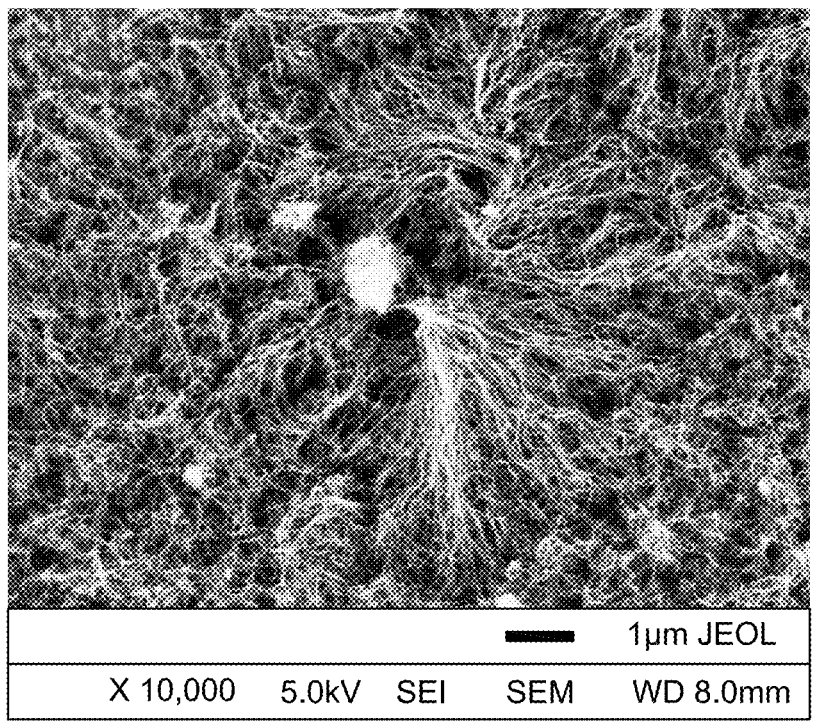
FIG. 13A shows an SEM image at a start of a densification process, according to certain embodiments.
Figure 13B:
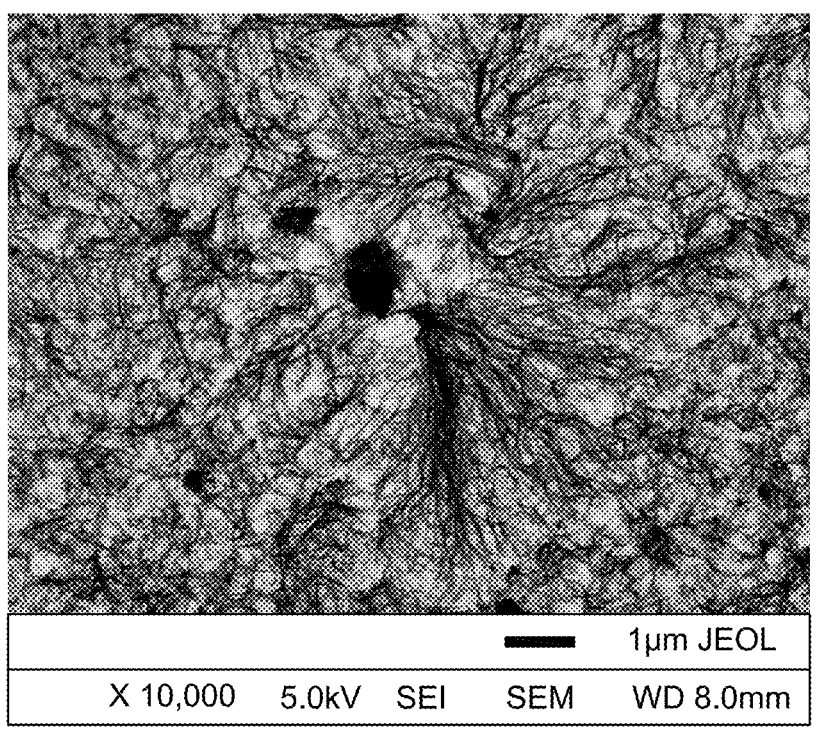
FIG. 13B shows an inverted contrast SEM image at the start of the densification process, according to certain embodiments.
Figure 14A:
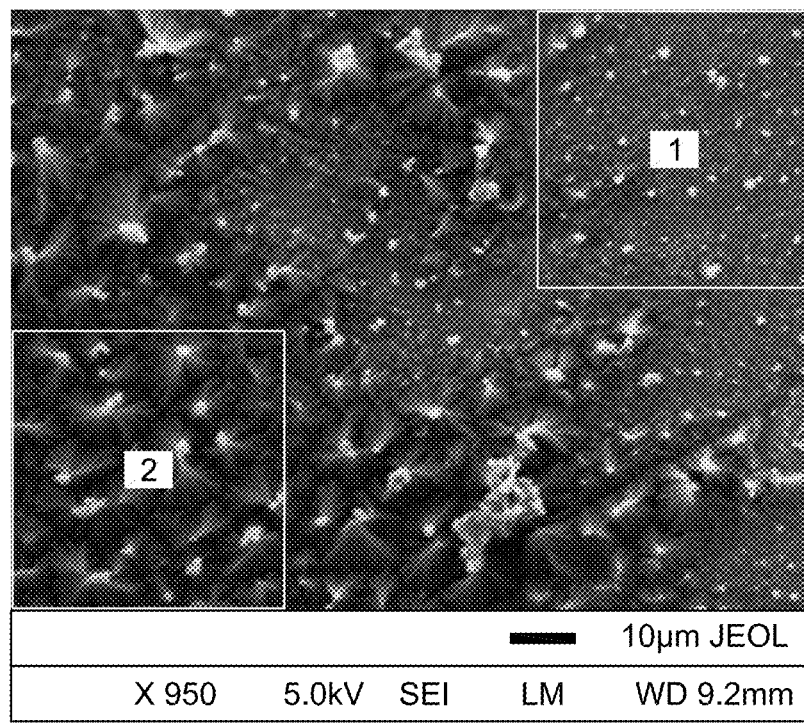
FIG. 14A shows SEM image depicting particle growth in two areas with (1) initial growth and (2) advanced growth, according to certain embodiments.
Figure 14B:
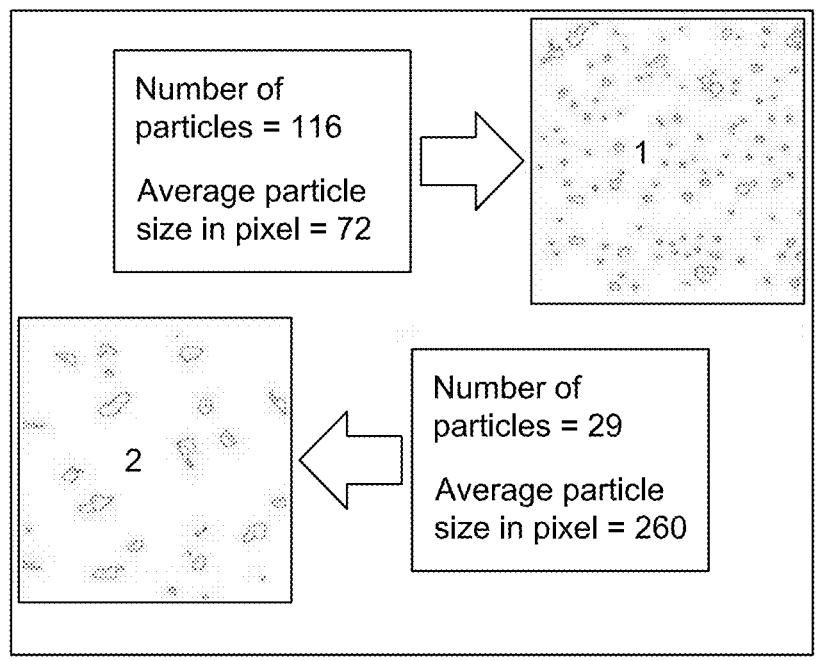
FIG. 14B shows a top aggregations of the CNT bundles counted using ImageJ, according to certain embodiments.
Figure 15A:
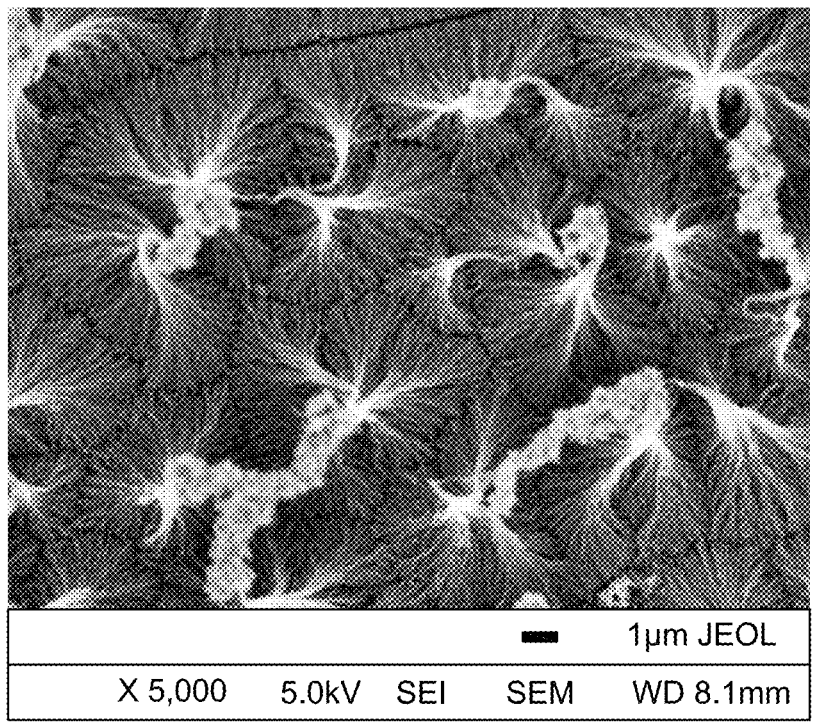
FIG. 15A is an SEM image of the CNT bundles showing a twisted collective process of the heads, according to certain embodiments.
Figure 15B:
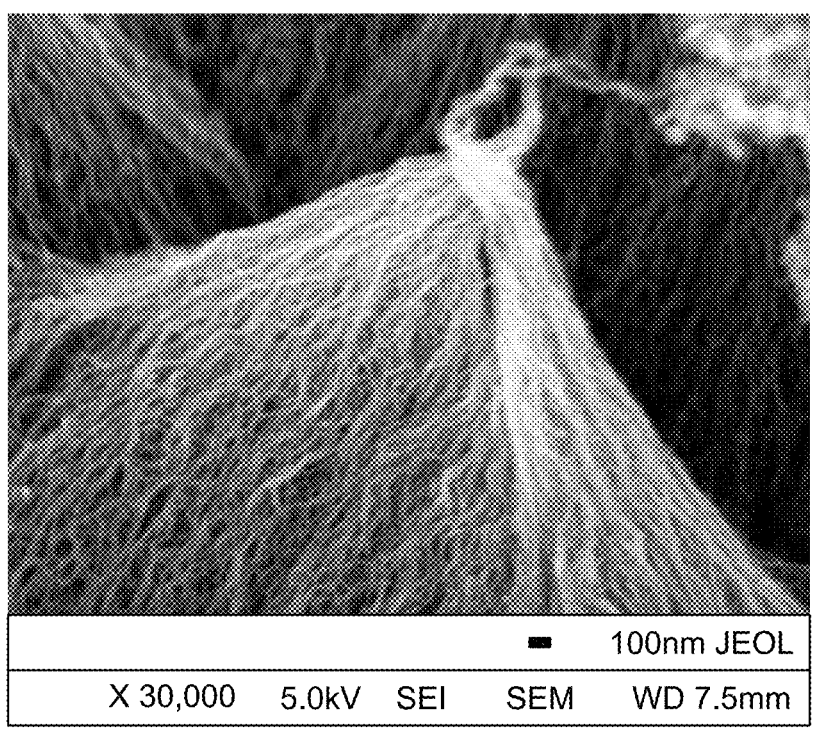
FIG. 15B shows a tilted image illustrating a helical twist, according to certain embodiments.

Although densification during tube growth experiments was highly reproducible, the underlying mechanism is analyzed. The following observations may offer insights. The first observation is the collective behavior of the nanotube tips during their growth. FIG. 13A shows the early stage of densification during CNT growth, and FIG. 13B is an inverted image of the same area. As mentioned earlier, the nanotubes grow in a tip growth mechanism, with the catalyst particle located at the top of the vertically grown nanotube. As seen from FIG. 13A and FIG. 13B, the tube tips are slightly tilted in a way to allow smaller particles to be attracted to the larger aggregates. From the same images, it can be observed that this attraction is unique in a way that the particles at the nanotube heads do not take direct shortcuts towards the bigger particles. Alternatively, they move in a way that requires them to align in the same path first. Even the grown densified bundles show that the smaller top aggregations are attracted by the larger ones similarly. To emphasize this observation, an area close to the substrate edge was imaged, which tends to be more strongly affected by gradients in temperature and plasma intensity and therefore has different growth rates. Two regions of interest are outlined and labeled (1) and (2) in FIG. 14A and FIG. 14B. The number of particle aggregates was counted using the particle counter feature in ImageJ software. At an early stage of growth at region (1), the number of particles is 116 with an average particle size of 72 pixels. In region (2) having more advanced growth, 29 particles with an average size of 260 pixels are observed. Comparing regions (1) and (2), evidently there is an attraction force between the neighboring aggregations, which results in a local collective mechanism during the growth. Another significant observation is a strong helical twist of the peaks when they get closer to each other. FIG. 15A is a top-view image of the CNT bundles where local peak centers are collected together. FIG. 15B is a side-tilted view of bundle heads twisted around each other in a helical shape, which might originate from an alignment process.

Example 5: Possible Densification Mechanism

The above observations may indicate that a magnetic dipole-dipole interaction is responsible for the collective process that gathers the heads of the bundles together. The relatively low CNTs site density facilitates the freedom for nanotube densification through dipole-dipole interaction. In other words, if the site density of the tubes was high, crowd effect would occur resulting in a forced vertical alignment of the tubes. Since the catalyst particles are magnetic (Fe$_3$O$_4$), this dipole-dipole interaction might have been present even during particle deposition as the solvent evaporated [Huke, B. & Lucke, M. Magnetic properties of colloidal suspensions of interacting magnetic particles. *Rep. Prog. Phys.* 67, 1731 (2004), which is incorporated herein by reference in its entirety]. The dipole-dipole potential between two particles i and j can be written as follows, $$V_{ij}^{DD} = -\frac{3(m_i \cdot \hat{r}_{ij})(m_j \cdot \hat{r}_{ij}) - m_i \cdot m_j}{4\pi\mu_o r_{ij}^3}, \quad (1)$$

where $m_i$ and $m_j$ are the magnetic moments of particles i and j, $\mu_o$ is the permeability of free space, $r_{ij}$ is the distance between i and j, and $\hat{r}$ is the unit vector pointing from i to j [Huke, B. & Lucke, M. Magnetic properties of colloidal suspensions of interacting magnetic particles. *Rep. Prog. Phys.* 67, 1731 (2004), which is incorporated herein by reference in its entirety]. In the simplest case of only two magnetic particles, this interaction should cause the attraction and alignment of their magnetic moments. If one particle is much more massive, the smaller one may be quickly drawn to the larger one while turning its dipole for alignment. In the case of a particle suspension, there will be local agglomerations everywhere due to the competing dipole-dipole interaction and Brownian motion [Wang, Z., Holm, C. & Müller, H. W. Molecular dynamics study on the equilibrium magnetization properties and structure of ferrofluids. *Phys. Rev. E* 66, 021405 (2002), which is incorporated herein by reference in its entirety].

Figure 16A:
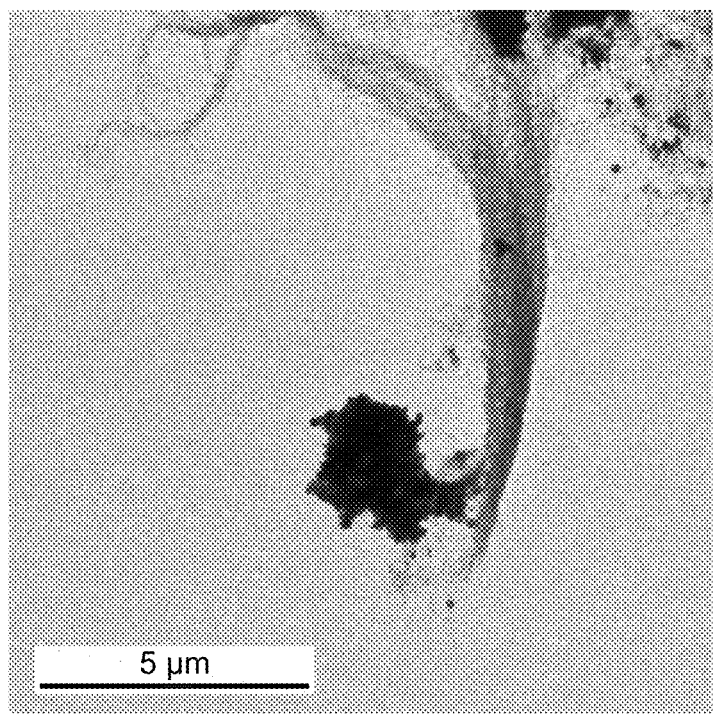
FIG. 16A is a TEM image depicting a wide-field view showing entire bundle with a head catalyst aggregation, according to certain embodiments.
Figure 16B:
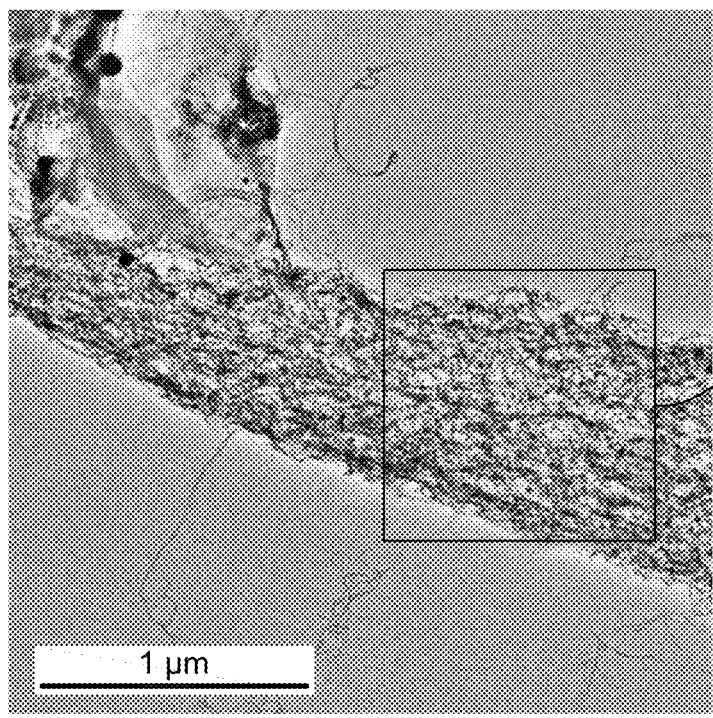
FIG. 16B is a TEM image depicting a densified CNT bundle, according to certain embodiments.
Figure 16C:
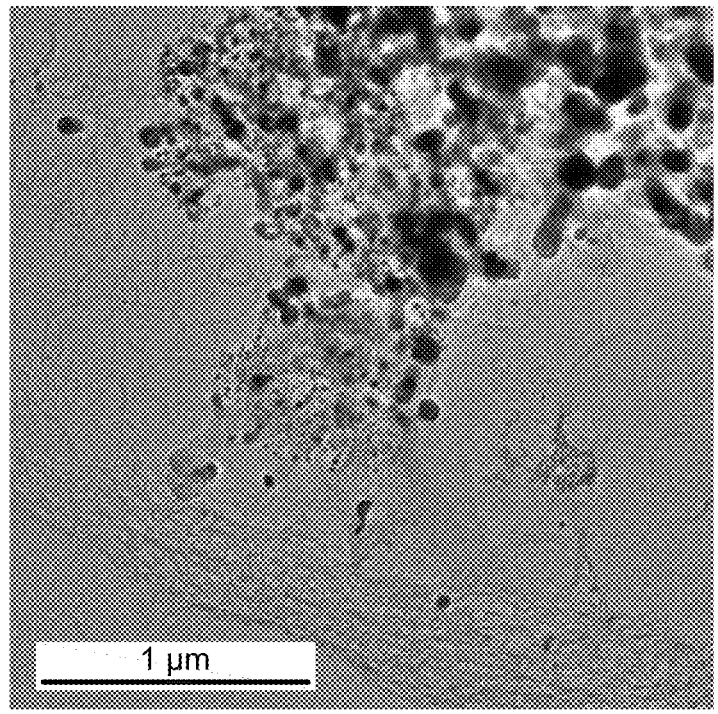
FIG. 16C is a TEM image depicting an aggregation head, according to certain embodiments.
Figure 16D:
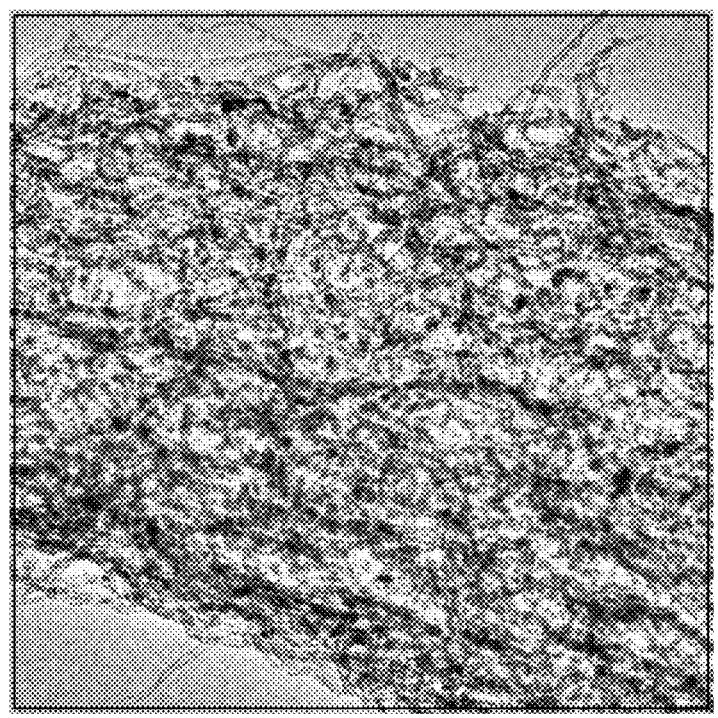
FIG. 16D is a TEM image depicting densified tubes showing catalyst particles in a tip growth mechanism, according to certain embodiments.
Figure 17A:
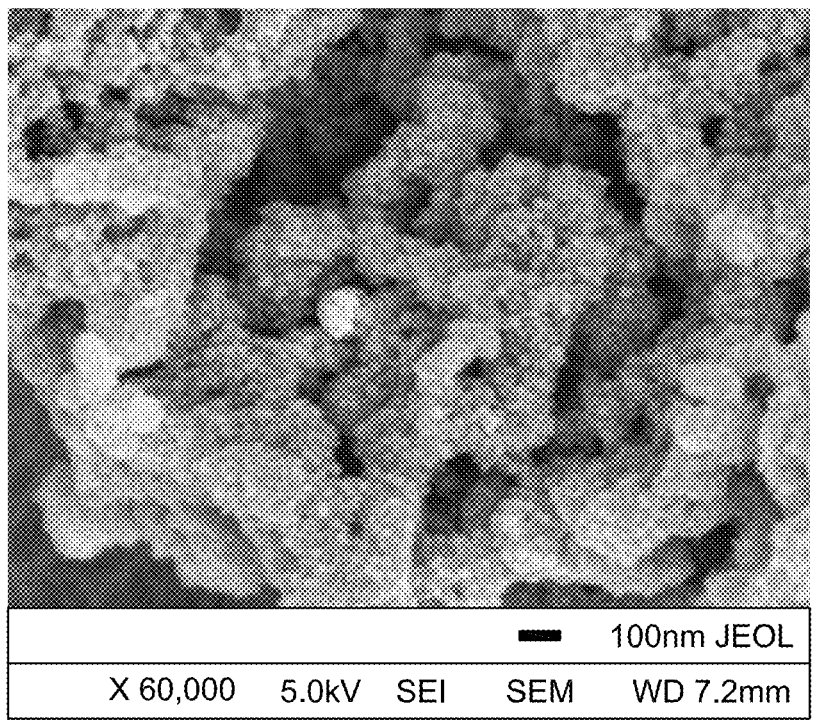
FIGS. 17A-17C show SEM images of a bundle head, according to certain embodiments.
Figure 17B:
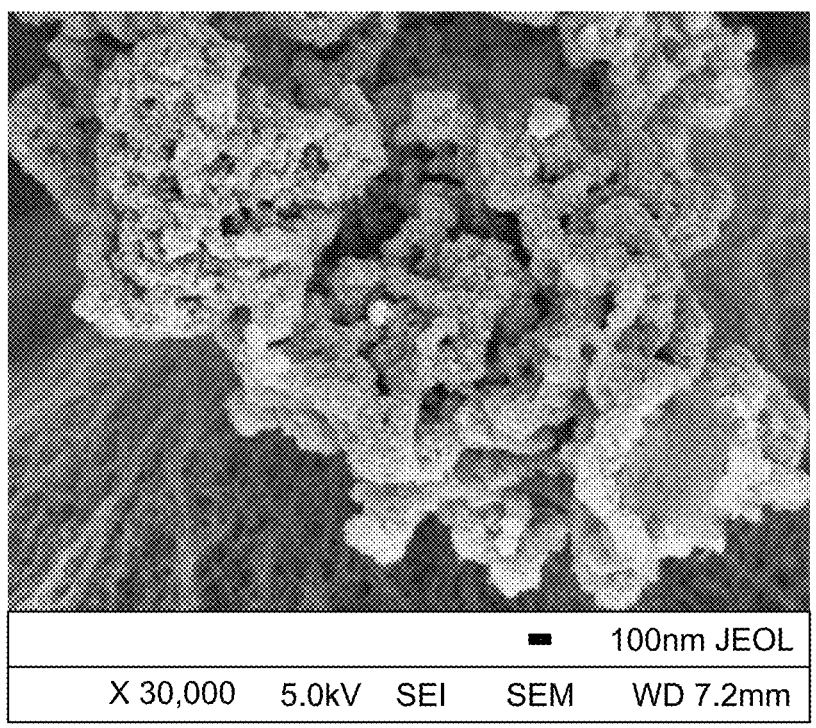
Figure 17C:
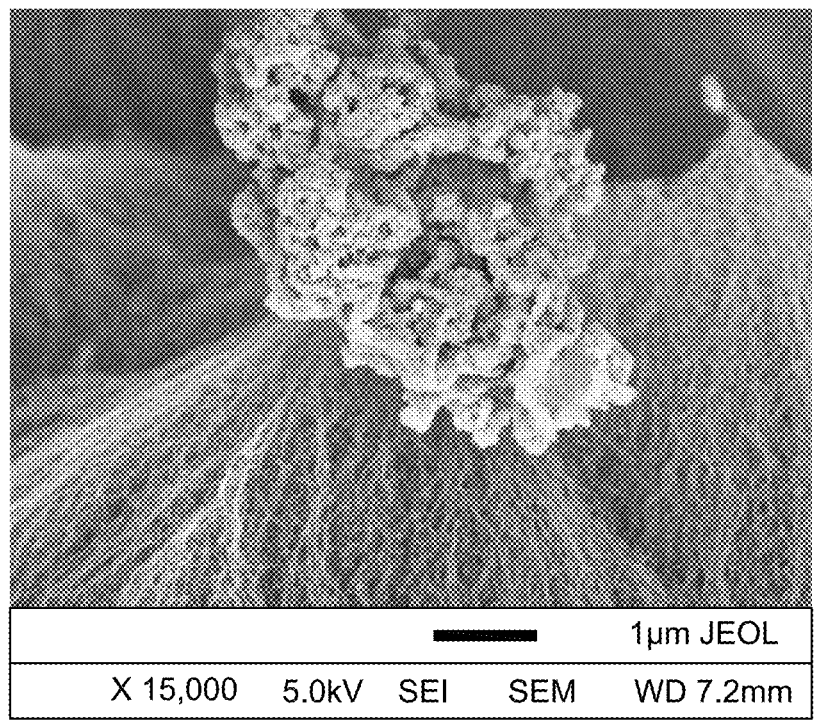

TEM was used to explore the catalyst distribution in the bundle head to further understand the densification mechanism. FIG. 16 presents four TEM images of the CNT bundle. FIG. 16A is a low-magnification image covering the entire bundle. The aggregated catalyst heads consisting of large particles can be seen in FIG. 16C. The average size of the as-synthesized particles (CNT bundles) is about 20 nm. The large particles in these TEM images could have formed due to either heat centering or particle attraction during the growth (FIG. 2). Complementary information from an SEM image of the catalyst heads (FIG. 17) supports the hypothesis of attraction as nanoparticles of ~20 nm size surrounded the large aggregations without affecting their shapes by the heat. FIG. 16B shows a dense CNT bundle, and the area outlined by a yellow rectangle is magnified in FIG. 16D. Some small catalyst particles are seen to be trapped within the CNT bundle as the tubes gather in the tip during their growth.

It is important to mention that the collective magnetic mechanism is just one cause of the mutual attraction between catalyst particles, which led to the collection of tube tips. The Van der Waals force is another important force that comes into play when the tube walls touch each other. In other words, the final bundle structure is due to a combination of two forces: the magnetic dipole-dipole interaction starts the process, and then the Van der Waals force takes over.

A mechanism, apparatus and method for the densification of MW-CNTs into bundles during their growth is described. Utilizing colloidal catalysts and microwave plasma-enhanced CVD, CNT bundles were grown in a highly reproducible manner. An advantage of the method of the present disclosure is to realize densification of nanotubes during growth cost-effectively. Further detailed observations indicate that magnetic dipole-dipole interaction among catalyst nanoparticles in the tip growth mechanism may drive the tubes to the center of larger aggregations with strong magnetic moments. After the tube walls approach each other, the Van der Waals force contributes to the final CNT bundle's structure.

The invention claimed is:

1. A method of making an array of vertically-aligned carbon nanotube bundles, the method comprising:
dispersing iron oxide nanoparticles in a solvent to form a suspension;
wherein the iron oxide nanoparticles have an average particle size of 5 to 35 nm;
dipping a TiN-coated substrate in the suspension and removing to form a suspension-coated substrate;
drying the suspension-coated substrate by evaporating the solvent from the suspension-coated substrate to form a first sample;
treating the first sample by microwave plasma under hydrogen flow at 500° C. to 700° C. to form a pre-treated sample; and
treating the pre-treated sample by microwave plasma under methane flow at 500° C. to 700° C. to form the vertically-aligned carbon nanotube bundles.

2. The method of claim 1, wherein the iron oxide nanoparticles comprise $Fe_3O_4$, and wherein an average number density of the iron oxide nanoparticles on a surface of the TiN-coated substrate is in a range of 800 to 1,200 particles/$\mu m^2$.

3. The method of claim 1, wherein the solvent is at least one selected from the group consisting of hexane, cyclohexane, heptane, diethyl ether, butane, iso-butylene, pentane, acetone, and dichloromethane.

4. The method of claim 1, wherein the TiN-coated substrate is a TiN-coated stainless steel.

5. The method of claim 1, wherein the hydrogen flow is introduced onto the first sample at a rate of 50 to 150 standard cubic centimeters per minute (sccm).

6. The method of claim 1, wherein the methane flow is introduced onto the pre-treated sample at a rate of 5 to 50 sccm.

7. The method of claim 1, wherein the treating by microwave plasma is conducted under pressure of 4 to 10 kPa with microwave power of 500 to 1500 W for 5 to 30 minutes.

8. The method of claim 1, wherein the vertically-aligned carbon nanotube bundles:
have ends opposite to where the carbon nanotube bundles are attached; and
are twisted into helical configurations.

9. The method of claim 8, wherein the vertically-aligned carbon nanotube bundles further comprise cauliflower-shaped aggregates formed at the ends of the helical configurations of the bundles, and wherein the cauliflower-shaped aggregates are formed by nanoparticles with an average particle size of 5 to 35 nm.

10. The method of claim 1, wherein the vertically-aligned carbon nanotube bundles comprise carbon nanotube bundles, and wherein an average number density of the carbon nanotube bundles on a surface of the TiN-coated substrate is in a range of $3 \times 10^9$ to $5 \times 10^9$ bundles/$m^2$, and wherein an average nearest distance between carbon nanotube bundles is in a range of 10 to 20 $\mu m$.

11. The method of claim 1, wherein the carbon nanotube bundles comprise multiwall carbon nanotubes, and wherein the multiwall carbon nanotubes have:
an average number of 3 to 20 walls per multiwall carbon nanotube;
an average inner diameter in a range of 7 to 13 nm;
an average outer diameter in a range of 10 to 16 nm; and
an average height in a range of 14 to 23 $\mu m$.

12. The method of claim 1, further comprising:
preparing the iron oxide nanoparticles by:
mixing and dissolving a fatty acid in dialkyl ether to form a first mixture;
heating the first mixture at 90 to 120° C.;
mixing an iron precursor with the mixture after the heating and refluxing at 250 to 350° C. for 0.5 to 2 hours to form a second mixture comprising the iron oxide nanoparticles;
separating the iron oxide nanoparticles from the second mixture, washing, and drying to form the iron oxide nanoparticles.

13. The method of claim 12, wherein the fatty acid has a carbon chain ranging from 10 to 22 carbon atoms in length.

14. The method of claim 12, wherein the fatty acid is oleic acid.

15. The method of claim 12, wherein the dialkyl ether is a di-n-alkyl ether having a total of from 12 to 36 carbon atoms, and wherein the di-n-alkyl ether is at least one selected from the group consisting of di-n-octyl ether, di-n-decyl ether, di-n-nonyl ether, n-undecyl ether, di-n-dodecyl ether, n-hexyl n-octyl ether, n-octyl n-decyl ether, n-decyl n-undecyl ether, n-undecyl n-dodecyl ether, n-hexyl n-undecyl ether, di-tert-butyl ether, di-isopentyl ether, di-3-ethyl decyl ether, tert-butyl n-octyl ether, iso-pentyl n-octyl ether, 2-methylpentyl n-octyl ether.

16. The method of claim 12, wherein the dialkyl ether is dioctyl ether.

17. The method of claim 12, wherein the iron precursor is at least one selected from the group consisting of an iron complex, iron carbonyl, an iron salt, an iron salt of saturated or unsaturated fatty acid, an organic iron compound, and an iron-sandwich-complex.

18. The method of claim 12, wherein the iron precursor is iron carbonyl, and wherein the iron carbonyl is at least one selected from the group consisting of iron dicarbonyl (Fe$(CO)_2$), iron tetracarbonyl (Fe$(CO)_4$), and iron pentacarbonyl (Fe$(CO)_5$).

19. The method of claim 12, wherein a molar ratio of iron precursor and dialkyl ether is 1:50 to 1:15, and wherein a molar ratio of iron precursor and fatty acid is 1:1 to 1:10.

20. The method of claim 12, wherein the iron precursor is present in the dialkyl ether at a concentration of 0.05 to 0.3 M, and wherein the fatty acid is present in the dialkyl ether at a concentration of 0.1 to 1 M.

* * * * *